(12) United States Patent
Richards

(10) Patent No.: US 11,741,941 B2
(45) Date of Patent: Aug. 29, 2023

(54) CONFIGURABLE NEURAL SPEECH SYNTHESIS

(71) Applicant: SoundHound, Inc., Santa Clara, CA (US)

(72) Inventor: Andrew Richards, Toulouse (FR)

(73) Assignee: SoundHound, Inc, Santa Clara, CA (US)

( * ) Notice: Subject to any disclaimer, the term of this patent is extended or adjusted under 35 U.S.C. 154(b) by 0 days.

(21) Appl. No.: 17/341,082

(22) Filed: Jun. 7, 2021

(65) Prior Publication Data

US 2021/0390944 A1 Dec. 16, 2021

Related U.S. Application Data

(60) Provisional application No. 62/705,127, filed on Jun. 12, 2020.

(51) Int. Cl.
*G10L 13/047* (2013.01)
*G10L 13/08* (2013.01)
(Continued)

(52) U.S. Cl.
CPC ............ *G10L 13/047* (2013.01); *G06F 3/167* (2013.01); *G06N 3/04* (2013.01); *G06N 3/084* (2013.01);
(Continued)

(58) Field of Classification Search
CPC ..... G10L 13/047; G10L 13/033; G10L 13/08; G10L 15/26; G06F 3/167; G06F 3/04847;
(Continued)

(56) References Cited

U.S. PATENT DOCUMENTS 9,558,734 B2   1/2017 Patel et al.
9,792,900 B1 * 10/2017 Kaskari .................. G10L 15/20
(Continued)

OTHER PUBLICATIONS

Hayashi, Tomoki, Ryuichi Yamamoto, Katsuki Inoue, Takenori Yoshimura, Shinji Watanabe, Tomoki Toda, Kazuya Takeda, Yu Zhang, and Xu Tan. "ESPnet-TTS: Unified, reproducible, and integratable open source end-to-end text-to-speech toolkit." In ICASSP 2020-2020 IEEE International Conference on Acoustics, Speech and Signal Processing (ICASSP), pp. 7654-7658. IEEE, 2020.
(Continued)

*Primary Examiner* — Jesse S Pullias
*Assistant Examiner* — Michael C. Lee
(74) *Attorney, Agent, or Firm* — Platinum Intellectual Property LLP

(57) ABSTRACT

A discriminator trained on labeled samples of speech can compute probabilities of voice properties. A speech synthesis generative neural network that takes in text and continuous scale values of voice properties is trained to synthesize speech audio that the discriminator will infer as matching the values of the input voice properties. Voice parameters can include speaker voice parameters, accents, and attitudes, among others. Training can be done by transfer learning from an existing neural speech synthesis model or such a model can be trained with a loss function that considers speech and parameter values. A graphical user interface can allow voice designers for products to synthesize speech with a desired voice or generate a speech synthesis engine with frozen voice parameters. A vector of parameters can be used for comparison to previously registered voices in databases such as ones for trademark registration.

20 Claims, 17 Drawing Sheets

(51) Int. Cl.
*G10L 13/033* (2013.01)
*G10L 15/26* (2006.01)
*G06N 3/084* (2023.01)
*G06N 3/04* (2023.01)
*G06F 3/16* (2006.01)
*G06F 3/04847* (2022.01)

(52) U.S. Cl.
CPC ............ *G10L 13/033* (2013.01); *G10L 13/08* (2013.01); *G10L 15/26* (2013.01); *G06F 3/04847* (2013.01)

(58) Field of Classification Search
CPC ........ G06N 3/04; G06N 3/084; G06N 3/0454; G06N 3/0481; A63F 9/24
See application file for complete search history.

(56) References Cited

U.S. PATENT DOCUMENTS

| | | | | |
|---|---|---|---|---|
| 10,930,263 | B1* | 2/2021 | Mahyar | G10L 15/005 |
| 11,348,601 | B1* | 5/2022 | Deshpande | G06F 40/30 |
| 11,410,684 | B1* | 8/2022 | Klimkov | G10L 25/78 |
| 2006/0095265 | A1* | 5/2006 | Chu | G10L 13/033 704/E13.004 |
| 2014/0007155 | A1* | 1/2014 | Vemparala | H04N 21/8405 725/32 |
| 2016/0005392 | A1 | 1/2016 | Agiomyrgiannakis | |
| 2016/0140951 | A1 | 5/2016 | Agiomyrgiannakis et al. | |
| 2018/0130471 | A1* | 5/2018 | Trufinescu | G06F 9/453 |
| 2018/0330713 | A1* | 11/2018 | Hoory | G10L 13/033 |
| 2018/0366138 | A1* | 12/2018 | Ramprashad | G10L 21/0208 |
| 2020/0013409 | A1* | 1/2020 | Mori | G10L 13/033 |
| 2020/0193971 | A1* | 6/2020 | Feinauer | G06F 40/44 |
| 2021/0075787 | A1* | 3/2021 | Zhang | G10L 25/24 |
| 2021/0097976 | A1* | 4/2021 | Chicote | G10L 13/047 |
| 2021/0208916 | A1* | 7/2021 | Wang | G06F 9/45558 |
| 2021/0225357 | A1* | 7/2021 | Zhao | G10L 15/22 |
| 2021/0256961 | A1* | 8/2021 | Garman | G06N 3/0454 |
| 2021/0319780 | A1* | 10/2021 | Aher | G06F 40/30 |
| 2022/0051655 | A1* | 2/2022 | Kanagawa | G06N 3/0454 |

OTHER PUBLICATIONS

Arik, Sercan, Gregory Diamos, Andrew Gibiansky, John Miller, Kainan Peng, Wei Ping, Jonathan Raiman, and Yanqi Zhou. "Deep voice 2: Multi-speaker neural text-to-speech." arXiv preprint arXiv:1705.08947 (2017).

Jia, Ye, Yu Zhang, Ron J. Weiss, Quan Wang, Jonathan Shen, Fei Ren, Zhifeng Chen et al. "Transfer learning from speaker verification to multispeaker text-to-speech synthesis." arXiv preprint arXiv:1806.04558 (2018).

Lee, Younggun, Taesu Kim, and Soo-Young Lee "Voice imitating text-to-speech neural networks" arXiv preprint arXiv:1806.00927 (2018).

Chen, Mengnan, Minchuan Chen, Shuang Liang, Jun Ma, Lei Chen, Shaojun Wang, and Jing Xiao. "Cross-Lingual, Multi-Speaker Text-To-Speech Synthesis Using Neural Speaker Embedding." In INTERSPEECH, pp. 2105-2109. 2019.

Get started with Custom Voice, https://docs.microsoft.com/en-us/azure/cognitive-services/speech-service/how-to-custom-voice, Feb. 17, 2020.

Prepare data to create a custom voice, https://docs.microsoft.com/en-us/azure/cognitive-services/speech-service/how-to-custom-voice-prepare-data, Nov. 4, 2019.

Create a Custom Voice, https://docs.microsoft.com/en-us/azure/cognitive-services/speech-service/how-to-custom-voice-create-voice, Nov. 4, 2019.

Record voice samples to create a custom voice, https://docs.microsoft.com/en-us/azure/cognitive-services/speech-service/record-custom-voice-samples, Apr. 13, 2020.

Custom Voice, microsoft.com, 2020.

Neural TTS, https://docs.aws.amazon.com/polly/latest/dg/NTTS-main.html, May 19, 2020.

Cloud Text-to-Speech: Text-to-speech conversion powered by machine learning, https://cloud.google.com/text-to-speech, May 19, 2020. MCL.

WaveNet and other synthetic voices, https://cloud.google.com/text-to-speech/docs/wavenet, May 19, 2020.

Supported voices and languages | Cloud Text-to-Speech Documentation, https://cloud.google.com/text-to-speech/docs/voices, May 19, 2020.

Oord, Aaron van den, Sander Dieleman, Heiga Zen, Karen Simonyan, Oriol Vinyals, Alex Graves, Nai Kalchbrenner, Andrew Senior, and Koray Kavukcuoglu. "Wavenet: A generative model for raw audio." arXiv preprint arXiv:1609.03499 (2016).

Shen, Jonathan, Ruoming Pang, Ron J. Weiss, Mike Schuster, Navdeep Jaitly, Zongheng Yang, Zhifeng Chen et al. "Natural tts synthesis by conditioning wavenet on mel spectrogram predictions." In 2018 IEEE International Conference on Acoustics, Speech and Signal Processing (ICASSP), pp. 4779-4783. IEEE, 2018.

Ping, Wei, Kainan Peng, Andrew Gibiansky, Sercan O. Arik, Ajay Kannan, Sharan Narang, Jonathan Raiman, and John Miller. "Deep voice 3: Scaling text-to-speech with convolutional sequence learning." arXiv preprint arXiv:1710.07654 (2017).

Zhang, Mingyang, Xin Wang, Fuming Fang, Haizhou Li, and Junichi Yamagishi. "Joint training framework for text-to-speech and voice conversion using multi-source tacotron and wavenet" arXiv preprint arXiv:1903.12389 (2019).

Text-to-Speech, https://us-east-1.console.aws.amazon.com/polly/home/SynthesizeSpeech, 2019.

Donahue, Jeff, Sander Dieleman, Mikolaj Bihkowski, Erich Eisen, and Karen Simonyan. "End-to-end adversarial text-to-speech." arXiv preprint arXiv:2006.03575 (2020).

* cited by examiner

CONFIGURABLE NEURAL SPEECH SYNTHESIS

CROSS-REFERENCES TO RELATED APPLICATIONS

This application claims the benefit of U.S. Provisional Patent Application No. 62/705,127, entitled "CONFIGURABLE NEURAL SPEECH SYNTHESIS," filed Jun. 12, 2020; which is incorporated herein by reference for all purposes.

BACKGROUND

As people are increasingly utilizing a variety of computing devices, including portable devices such as tablet computers and smart phones, it can be advantageous to adapt the ways in which people interact with these devices. For example, different voice data may be desirable for a variety of applications. In an example, it may be desirable to generate text-to-speech (TTS) voices for video game characters to provide a more interactive and immersive gaming experience. In another example, a user may desire a TTS voice that represents their qualities, such as gender, age, regional accent, etc. However, conventional TTS voices for speech synthesis, using, e.g., concatenative or other approaches, are trained on a single speaker. As such, the playback sound is configurable only along typical digital signal processing (DSP) parameters such as pitch and speed. As a result, machines using a voice sound the same or, for machines to have unique sounding voices, a large or expensive effort is required to collect training data. This is often not practical for voice-enabling large numbers of diverse devices including ones from small companies or developers with financial or time-to-market constraints. Accordingly, it is desirable to provide improved techniques for text-to-speech.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
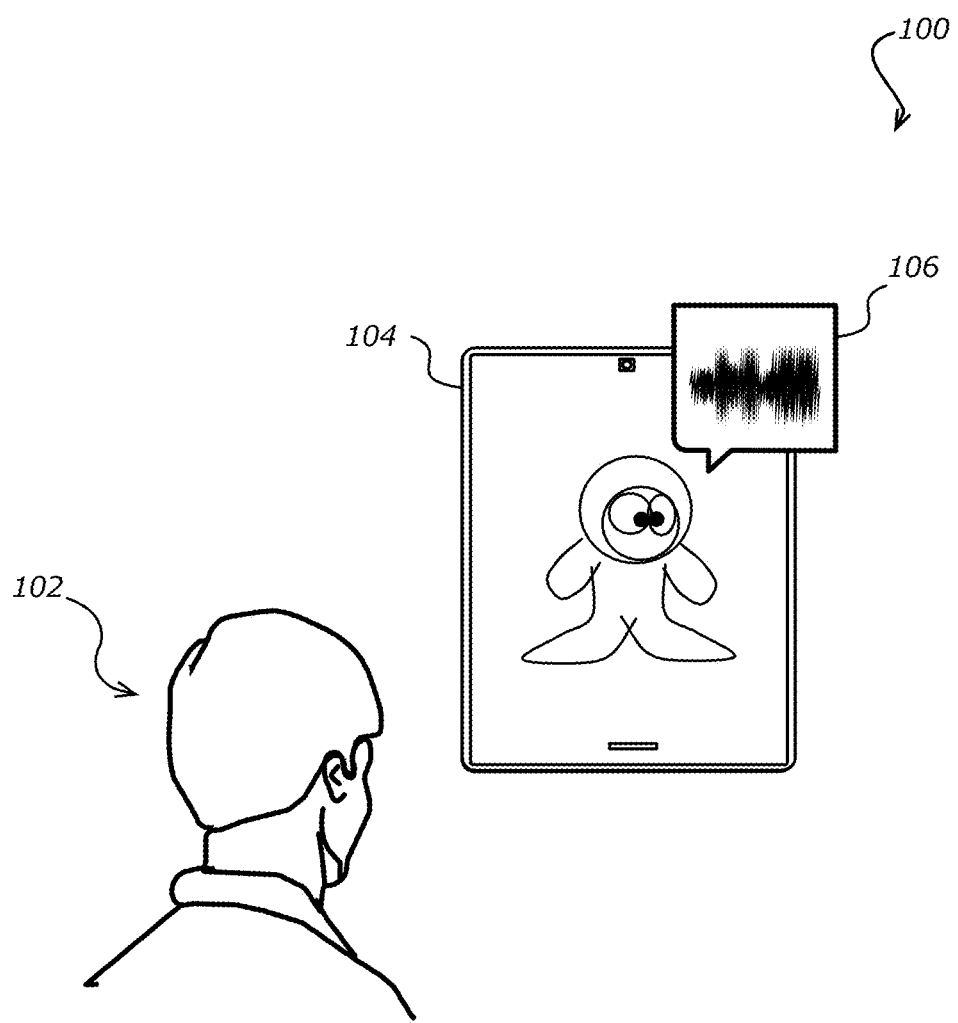
FIG. 1 illustrates an example of a user receiving synthesized speech audio in accordance with embodiments herein.

Systems and methods in accordance with various embodiments of the present disclosure may overcome one or more of the aforementioned and other deficiencies experienced in conventional approaches to speech synthesis. In particular, various embodiments described herein provide for configurable neural speech synthesis that may be used separately or in combinations within devices, systems, processes, and methods.

In an embodiment, one example includes a computerized process of training a model (e.g., a neural speech synthesis model or a speech synthesis model) that can generate speech audio (also referred to as voice data) conditioned on a value of a voice property. In this example, source samples of speech audio (e.g., voice data from an individual such as a voice donor or machine-generated voice data from a TTS system or other audio generation system) are obtained. The source samples are labeled with discrete values of a voice property, including, for example, a gender voice property, an age voice property, an accent voice property, a timbre voice property. Other voice properties may indicate whether the source samples indicate the attitude of the speaker, such as whether the speaker appears happy, sad, calm, excited, formal, casual, etc.

A discriminator is trained from the source samples and labels. The discriminator is configured to generate a probability value that quantifies the likelihood of the voice property from a sample of speech audio.

A model (e.g., neural speech synthesis model or synthesis model) is trained by synthesizing a multiplicity of synthesized speech samples using the model with a diverse set of voice property values. Corresponding properties are generated for the synthesized speech samples using the discriminator. A property-learning weight adjustment is generated by back-propagating changes to minimize a loss function that depends on the difference between the voice property values and corresponding probabilities.

In certain embodiments, synthesizing the multiplicity of synthesized speech samples uses a transcription of source samples, and the process further comprises computing a source-matching weight adjustment by back-propagating changes to minimize a loss function that depends on differences between the source samples and the synthesized speech. Such a process allows for the simultaneous training of the neural speech synthesis model for the conversion of text to speech and the ability to provide different voice sounds. The process also prevents the synthesis model from learning to generate an undesirable output or other output signal that causes the discriminator to output inauthentic or otherwise undesirable speech (e.g., an output that does not sound like real or expected speech). Simultaneous training is an alternative to first training a general speech synthesis model and then augmenting the training to be able to create variations in voices.

Thereafter, in response to receiving a string of text and at least one voice property value at the model (e.g., the neural speech synthesis model or synthesis model), the model evaluates the string of text and the voice property value to convert the text to speech audio in a voice based on the voice property value. Said in another way, the model synthesizes speech audio corresponding to the text based on the voice property value. The at least one voice property can be ones that are meaningful to a user, such as gender. This allows a user to quickly and easily try different voice sounds and thereby find a voice that meets the needs of their product or use. Further, it allows for saving the property values and comparing them to others to ensure that they are different enough that different products' voices will be distinct. For example, users can adjust the sound of the synthesized voice by making it more male or younger or having a stronger Texas accent. Such configurability has the benefit of enabling rapid experimentation and testing of voices that can affect the perception and relatability of machines that employ speech synthesis as configured.

Instructions for causing a computer system to configure a speech synthesizer in accordance with the present disclosure may be embodied on a computer-readable medium. For example, in accordance with an embodiment, a backend system can receive at least one voice property value. The backend system can generate code for execution by a computer, the code implementing a neural network wherein a node in a hidden layer includes, in its summation, a constant term derived from the product of the voice property value and a weight learned from a training process. The backend system can output the code, wherein the code implements a speech synthesis function within the speech synthesizer.

Embodiments provide a variety of advantages. For example, in accordance with various embodiments, computer-based approaches for configuring a speech synthesizer can be utilized by content providers, device manufacturers, etc., and consumers of the content providers and device manufacturers. The speech synthesizer systems and approaches can improve the operation and performance of the computing devices on which they are implemented by, among other advantages, generating computer code for a speech synthesizer in which the TTS voice is frozen as configured by the at least one voice property value. This allows for creating embedded system devices or other systems that have a specific voice. Such systems can integrate the computer code in a modular way that simplifies the design of such systems. Further, it becomes impractical to change the voice such that once a user chooses and pays for a voice, they cannot change it without a second performing of the method.

The speech synthesizer system and approaches can be used by computer-based techniques to optimize resource utilization of various resources, for example, by generating code in a binary format. This improves modularity and further frustrates attempts at reverse engineering or changing the sound of the synthesized voice.

Further, because the voice property value may constitute a voice property vector, the speech synthesizer system and approaches allow for reading at least one stored voice property vector from a brand database and computing a distance between the stored voice property vector and the received property vector. This advantageously allows for a measurable comparison of the similarity of any two voices. For example, in response to the computed distance being closer than a threshold distance, an error message can be generated, which can be used to alert and/or prevent users from configuring a voice that is too similar to another voice. This avoids having different products in the marketplace with voices so similar that users of the product could be confused about which one is producing synthesized voices. In another example, in response to the computed distance being farther than a threshold distance, the received property value can be stored in the brand database. This allows for creating a database that is useful for comparing to future voice configurations to ensure branded voice differentiation.

Further still, the speech synthesizer system and approaches allow for examining trademarks. For example, the speech synthesizer system and approaches comprise receiving a specimen of speech audio with an application for a trademark registration; applying a discriminator of a plurality of voice property values to the specimen to compute a voice property vector; computing distances between the computed voice property vector and other voice property vectors stored in a database; and determining allowability of the application in dependence upon the smallest computed distance being greater than a threshold. Such an approach enables a government to examine voice trademark registration applications quickly and effectively to allow registrants to prevent the use of synthesized voices that could cause confusion as to the source of goods and services.

Various other functions and advantages are described and suggested below as may be provided in accordance with the various embodiments.

FIG. 1 illustrates an example situation 100 wherein a user 102 is interacting with a computing device 104. More specifically, computing device 104 is providing synthesized speech 106 for a gaming character to provide a more interactive and immersive gaming experience. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, televisions, notebook computers, personal data assistants, video gaming consoles or controllers, portable media players, and wearable computers (e.g., smart watches, smart glasses, etc.) among others. The computing device 104 includes a speaker to play audio including, for example, voice or speech data. The device can render an interface such as an application interface that can present content. The content can include text, images, video, audio, etc.

As described, speech synthesis is starting to become commonplace in computers, smartphones, and embedded systems such as smart speakers, robots, automobiles, mobile, portable, and wearable devices, computer terminal interfaces, telephone interactive voice response systems, public address systems, and others.

Certain companies and brands have invested in creating identifiable and sometimes trademarked sounds. For example, the roar of the lion at the beginning of Metro Goldwyn Mayer movies, the sound of a lightsaber in Star Wars, the jingle of T-Mobile phones, the DaDaDa DaDaDa sound of the ESPN sports entertainment network, the bloop of a Tivo remote control operation, and Homer Simpson's D'oh annoyed grunt. Huge variations of human voices are possible and yet some are clearly identifiable. For example, many people can recognize the voices of James Earl Jones, Jack Nicholson, or Kathleen Turner even without seeing their image.

As ever more different systems synthesize speech it is increasingly common for different systems to have similar-sounding voices, which is undesirable in part because it can create confusion among users and in part because it means that the systems associated with brands do not have a unique identity. Though synthesized speech can say essentially any words, people can recognize the sound of a voice no matter what words it says. To create recognizable brands, makers of voice-enabled systems desire for their systems to have voices that are both distinctive and have certain properties. It is also desirable for the providers of neural speech synthesis and related technologies to be able to provide such unique voices.

Voice designers want to be able to configure the voices by making changes and adjustments in ways that they expect. For example, they might want a voice that sounds a little bit younger or a little bit more like it has a New York accent. In another example, it may be desirable for user 102 to interact with game characters having different and varying voices. In this way, in an embodiment, a speech synthesis system should take as input voice property values along dimensions that are perceptibly meaningful such as gender, age, and accent.

Accordingly, in accordance with various embodiments, embodiments provide for configurable neural speech synthesis, which uses parametric speech synthesis that uses a neural network architecture to generate speech audio features. Configurable neural speech synthesis may be configurable by parameters, the values (e.g., gender, age, and accent) of which relate to voice properties in a way that has perceptible meaning. In an embodiment, TTS voice properties include natural voice characteristics, accents, and attitudes. Voice characteristics relate to physiological attributes of a voice, such as ones that vary distinguishably between gender and age. Accent relates to learned ways of producing phonemes, such as the variations between regions and ethnicities. Attitudes relate to feelings such as happiness, calmness, and formalness. This is in contrast to voices defined by voice embeddings in a machine-learned space such as X-vectors. The combined configurable range of each voice property parameter enables the speech synthesizer to synthesize a wide range of human-sounding voices. Furthermore, configurable neural speech synthesis may be language-specific or universal.

In various embodiments, beyond merely configuring voice properties as input parameters to speech synthesis, tags within the text to synthesize, in a format such as speech synthesis markup language (SSML), can indicate dynamic voice parameter values along dimensions learned by a neural network.

Figure 2:
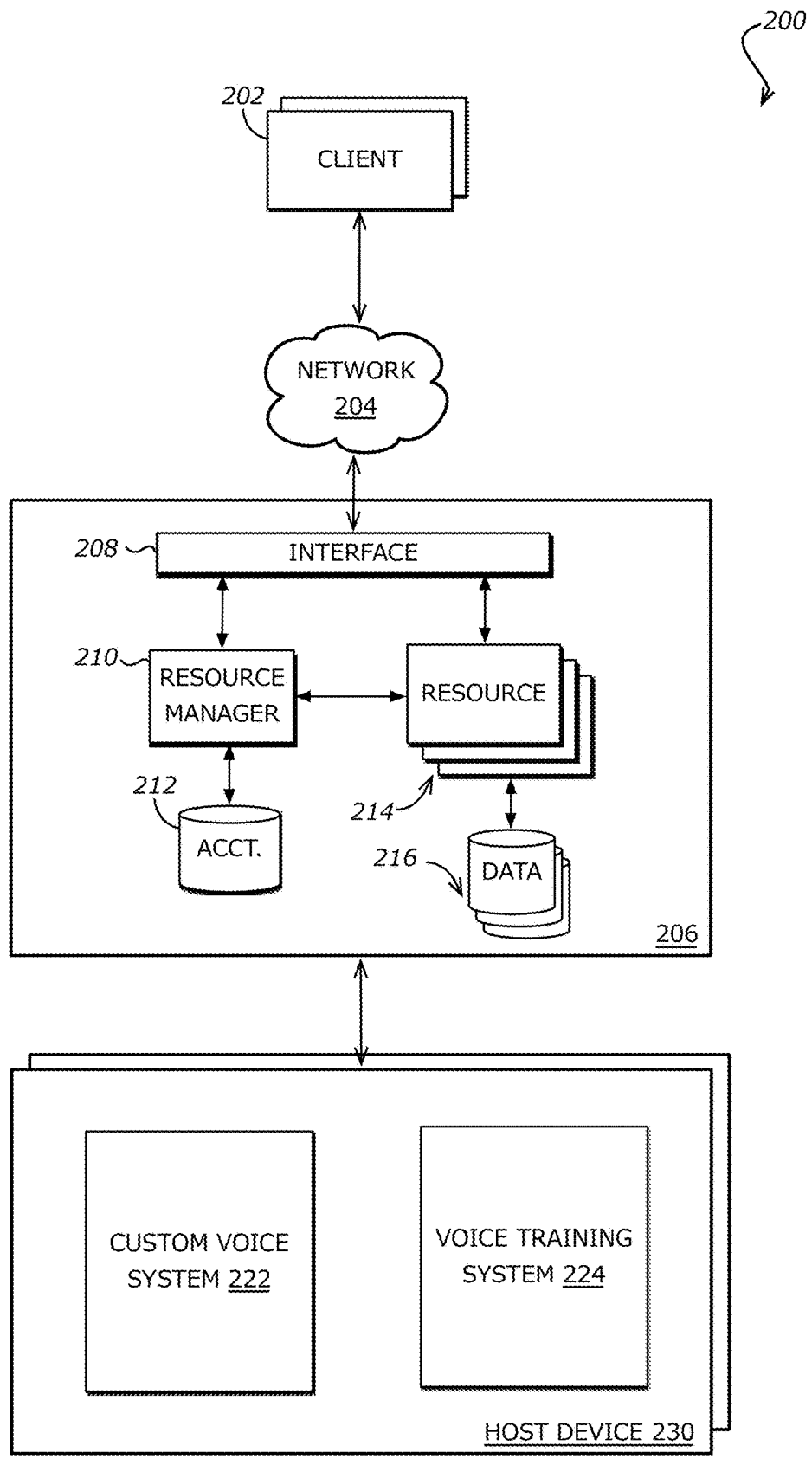
FIG. 2 illustrates an example environment in which aspects of the various embodiments can be utilized.

FIG. 2 illustrates an example environment 200 in which aspects of the various embodiments can be implemented. It should be understood that reference numbers are carried over between figures for similar components for purposes of simplicity of explanation, but such usage should not be construed as a limitation on the various embodiments unless otherwise stated. In this example, a user can utilize a client device 202 to communicate across at least one network 204 with a resource provider environment 206. The client device 202 can include any appropriate electronic device operable to send and receive requests or other such information over an appropriate network and convey information back to a user of the device. Examples of such client devices 202 include personal computers, tablet computers, smartphones, notebook computers, and the like. The user can include a person authorized to manage the aspects of the resource provider environment The resource provider environment 206 can provide speech synthesis services. These services can, for example, train a model (e.g., a neural speech synthesis model or a speech synthesis model) that can generate speech audio (also referred to as voice data) conditioned on a value of a voice property. This allows a user to quickly and easily try different voice sounds and thereby find a voice that meets the needs of their product or use. Further, it allows for saving the property values and comparing them to others to ensure that they are different enough that different products' voices will be distinct. In various embodiments, the speech synthesis services can be performed in hardware and software, or in combination thereof.

The network(s) 204 can include any appropriate network, including an intranet, the Internet, a cellular network, a local area network (LAN), or any other such network or combination, and communication over the network can be enabled via wired and/or wireless connections.

The resource provider environment 206 can include any appropriate components for training a model (e.g., a neural speech synthesis model or a speech synthesis model) that can generate speech audio (also referred to as voice data) conditioned on a value of a voice property, receiving speech data, presenting interfaces, etc. It should be noted that although the techniques described herein may be used for a wide variety of applications, for clarity of presentation, examples relate to speech synthesizing applications. The techniques described herein, however, are not limited to speech synthesizing applications, and approaches may be applied to other situations where managing voice data is desirable, such as creating voice banks, verifying voice data, trademarks, etc.

The resource provider environment 206 might include Web servers and/or application servers for obtaining and processing voice data to train a model (e.g., a neural speech synthesis model or a speech synthesis model) that can generate speech audio (also referred to as voice data) conditioned on a value of a voice property. While this example is discussed with respect to the internet, web services, and internet-based technology, it should be understood that aspects of the various embodiments can be used with any appropriate services available or offered over a network in an electronic environment, or devices otherwise not connected or intermittently connected to the internet.

In various embodiments, resource provider environment 206 may include various types of resources 214 that can be used to facilitate speech synthesis services. The resources can facilitate, for example, custom voice system 222, voice training system 224, application servers operable to process instructions provided by a user or database servers operable to process data stored in one or more data stores 216 in response to a user request.

Custom voice system 222 is operable to receive a string of text and at least one voice property value. Custom voice system 222 evaluates the string of text and the voice property value to convert the text to speech audio in a voice based on a value of the voice property value. Custom voice system 222 is described in greater detail below.

Voice training system 224 is operable to train a model (e.g., a neural speech synthesis model or a speech synthesis model) that can generate speech audio (also referred to as voice data) conditioned on a value of a voice property. For example, source samples of speech audio (e.g., voice data from an individual such as a voice donor or machine-generated voice data from a TTS system or other audio generation system) are obtained and the source samples are labeled with discrete values of a voice property. Voice training system 224 trains a discriminator from the source samples and labels. Voice training system 224 trains a model (e.g., neural speech synthesis model or synthesis model) by synthesizing a multiplicity of synthesized speech samples using the model with a diverse set of voice property values. Corresponding properties are generated for the synthesized speech samples using the discriminator. Voice training system 224 computes a property-learning weight adjustment by back-propagating changes to minimize a loss function that depends on the difference between the voice property values and corresponding probabilities.

In at least some embodiments, an application executing on the client device 202 that needs to access resources of the provider environment 206, for example, to initiate an instance of custom voice system 222 can submit a request that is received to interface layer 208 of the provider environment 206. The interface layer 208 can include application programming interfaces (APIs) or other exposed interfaces, enabling a user to submit requests, such as Web service requests, to the provider environment 206. Interface layer 208 in this example can also include other components as well, such as at least one Web server, routing components, load balancers, and the like.

When a request to access a resource is received at the interface layer 208 in some embodiments, information for the request can be directed to resource manager 210 or other such systems, service, or component configured to manage user accounts and information, resource provisioning and usage, and other such aspects. Resource manager 210 can perform tasks such as communicating the request to a management component or other control component which can be used to manage one or more instances of a custom voice system as well as other information for host machines, servers, or other such computing devices or assets in a network environment, authenticate an identity of the user submitting the request, as well as to determine whether that user has an existing account with the resource provider, where the account data may be stored in at least one data store 212 in the resource provider environment 206. For example, the request can be used to instantiate custom voice system 222 on host machine 230.

It should be noted that although host device 230 is shown outside the provider environment, in accordance with various embodiments, one or more components of custom voice system 222 can be included in provider environment 206, while in other embodiments, some of the components may be included in the provider environment. It should be further noted that host machine 230 can include or at least be in communication with other components, for example, content training and classification systems, image analysis systems, audio analysis systems, etc.

The various computing devices described herein are exemplary and for illustration purposes only. The system may be reorganized or consolidated, as understood by a person of ordinary skill in the art, to perform the same tasks on one or more other servers or computing devices without departing from the scope of the invention. The resources may be hosted on multiple server computers and/or distributed across multiple systems. Additionally, the components may be implemented using any number of different computers and/or systems. Thus, the components may be separated into multiple services and/or over multiple different systems to perform the functionality described herein. In some embodiments, at least a portion of the resources can be "virtual" resources supported by these and/or other components.

One or more links couple one or more systems, engines or devices to the network 204. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 204.

In particular embodiments, each system or engine may be a unitary server or may be a distributed server spanning multiple computers or multiple datacenters. Systems may be of various types, such as, for example and without limitation, web server, advertising server, file server, application server, or proxy server. In particular embodiments, each system may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types or may dynamically create or constitute files upon a request and communicate them to client devices or other devices in response to HTTP or other requests from client devices or other devices.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 2, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Training

Configurable neural speech synthesis uses a generative neural network that is a product of a training process, such as one implemented using voice training system 224. Multiple approaches to training are possible, and some examples are described below and can be utilized in voice training system 224. Some examples of a training process use supervised or semi-supervised learning, which requires samples of speech labeled according to discrete values of a voice property. Training labels are discrete values such as Booleans or enumerated types. Some examples of types of labels for training samples include child or not, male or female, one of several languages, one of several regional accents of a language such as New York, Texas, or China, timbre such as nasal, bright, or croaky, happy or sad, calm or excited, and formal or casual. Limiting the possible values of labels makes it easier for humans to label training samples at an acceptable rate. Asking human labelers to listen to speech recordings and estimate values on a continuous scale would slow labeling down.

Inference

Figure 3A:
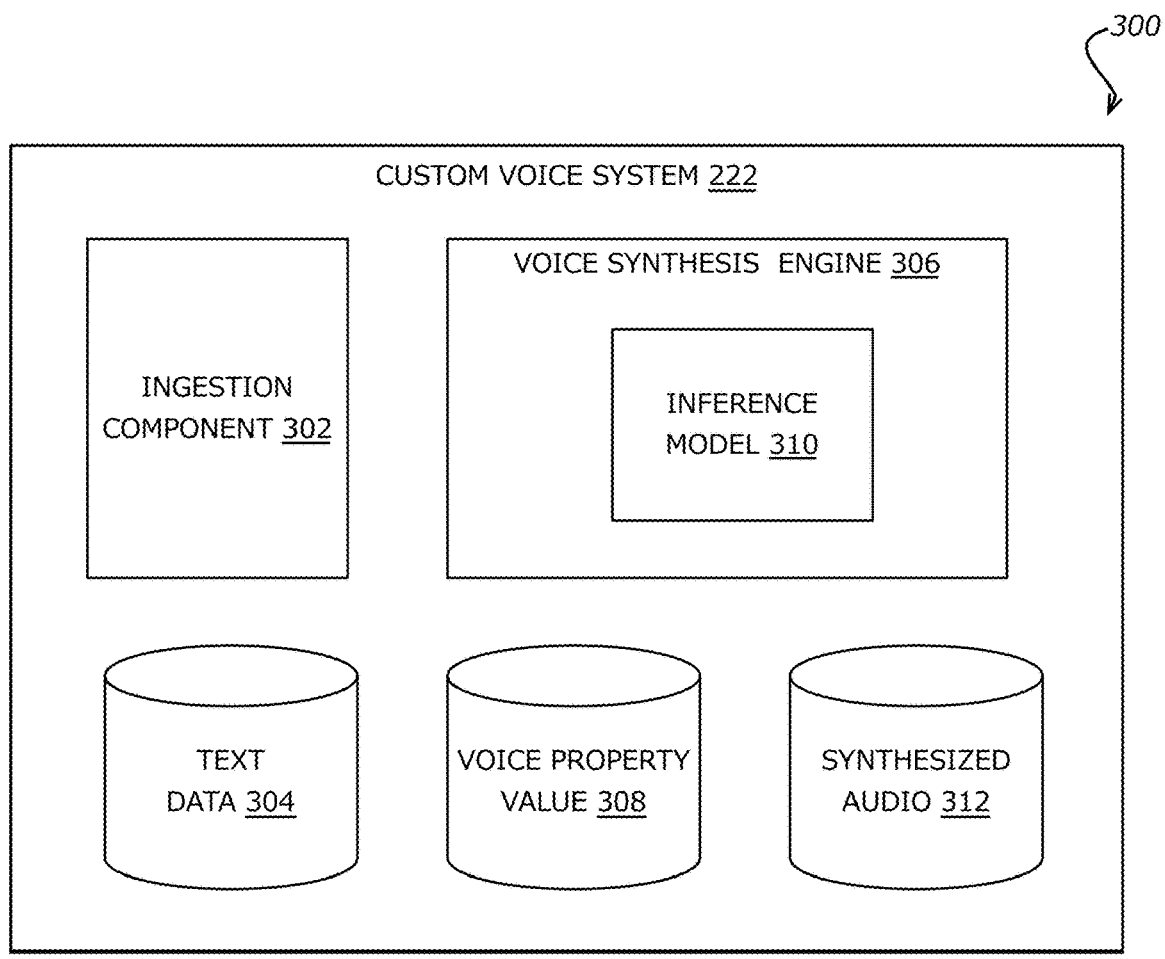
FIG. 3A illustrates a configurable speech synthesis model in accordance with various embodiments.

A model capable of inferring probabilities of properties of certain input samples is both a part of training and a result of training a configurable neural speech synthesis model. FIG. 3A illustrates an exemplary embodiment 300 of the custom voice system 222 in accordance with various embodiments. Custom voice system 222 can be implemented using software and/or hardware. It should be noted that the components of custom voice system 222 may be distributed among multiple server computers. For example, some servers could implement data collection and other servers could implement TTS voice synthesis. Further, some of these operations could by performed by other computers as described herein.

In this example, custom voice system 222 can include ingestion component 302, voice synthesis engine 306, text data store 304, and voice property value data store 308. Voice synthesis engine 306 can include configurable neural speech synthesis inference model 310.

Ingestion component 302 is operable to obtain text data and user preference data (e.g., voice property value data) from various sources via an interface. Sources may include one or more content providers. Content providers can include, for example, users, movie agencies, broadcast companies, cable companies, internet companies, game companies, vending and retail services companies, music and video distribution companies, government agencies, automobile companies, etc. In an embodiment, once the sources are identified, a variety of methodologies may be used to retrieve the relevant media data via the interface, including but not limited to, data scrapes, API access, etc. The text data may be stored in text data store 304 and the voice property value data may be stored in voice property value data store 308.

In an embodiment, the interface may include a data interface and a service interface that may be configured to periodically receive text, voice property value data, and/or other data. The interface can include any appropriate components known or used to receive requests or other data from across a network, such as may include one or more application programming interfaces (APIs) or other such interfaces for receiving such requests and/or data.

Figure 3B:
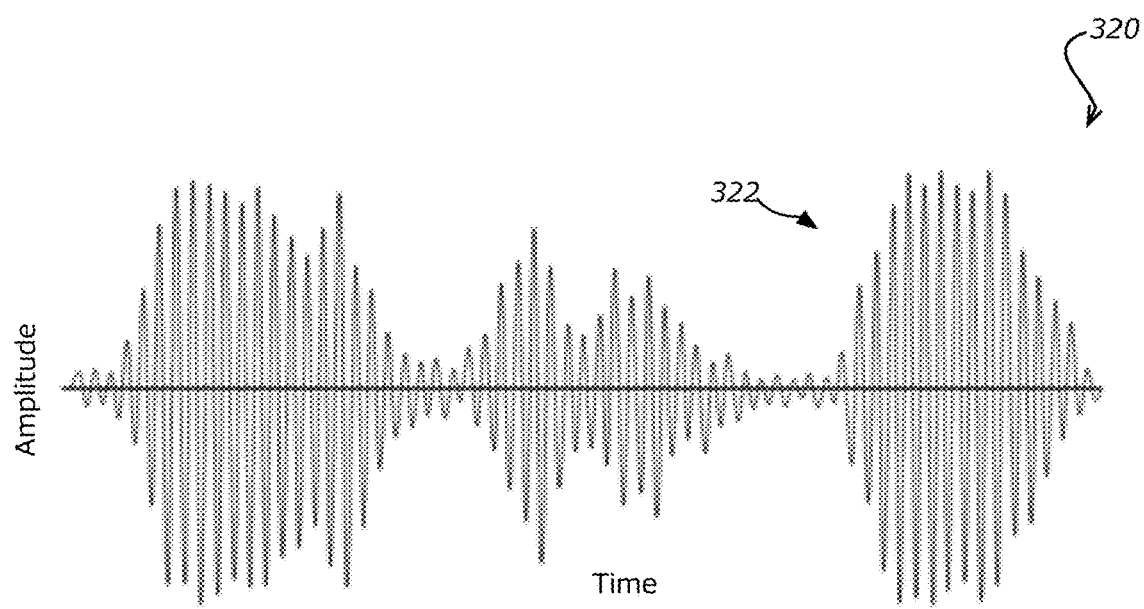
FIG. 3B illustrates a speech audio waveform according to an embodiment.

Configurable neural speech synthesis inference model 310 is capable of inferring probabilities of properties of certain input samples and is both a part of training and a result of training a configurable neural speech synthesis model. For example, configurable neural speech synthesis inference model 310 is operable to receive input text and one or more voice property values and generate synthesized speech audio as an output. The output can be stored in synthesized audio data store 312 or other appropriate data store, and/or otherwise utilized. FIG. 3B illustrates example 320 of an audio wave 322 of synthesized voice audio output from voice synthesis engine 306.

Figure 4A:
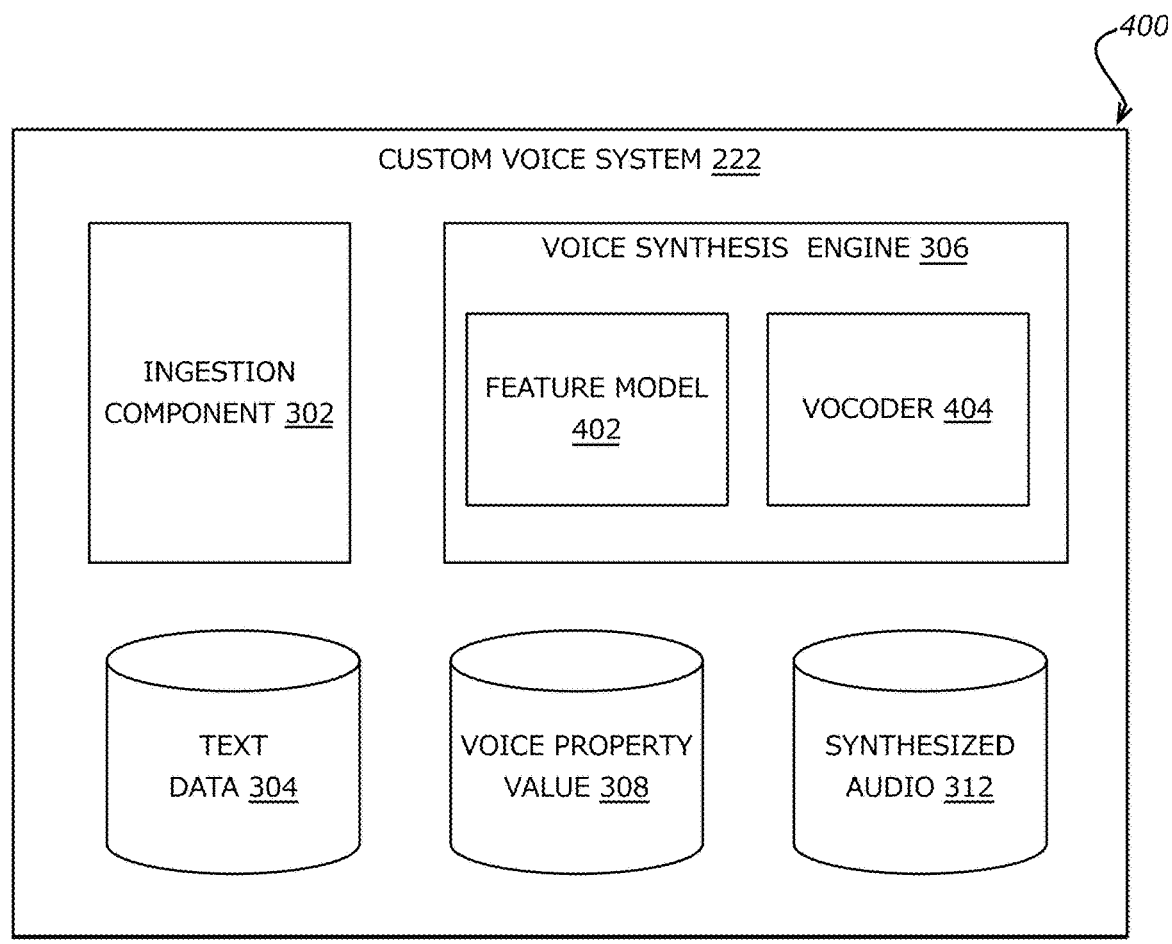
FIG. 4A illustrates a configurable speech synthesis model in accordance with an alternate embodiment.
Figure 4B:
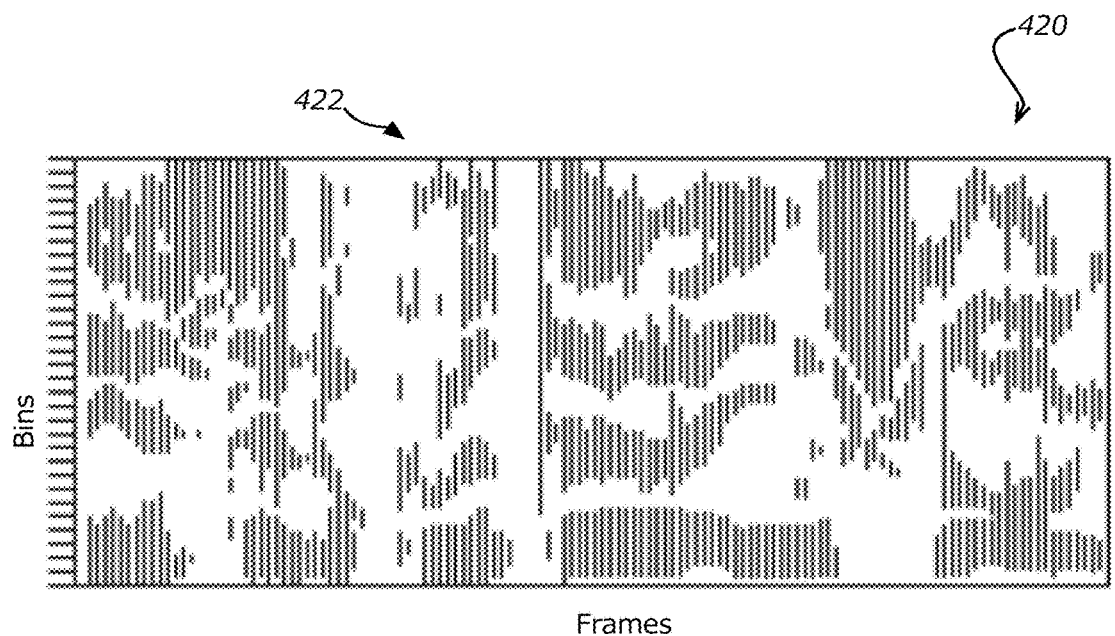
FIG. 4B illustrates a speech audio spectrogram according to an embodiment.

In an embodiment, some neural speech synthesis models may use more than one internal neural network. For example, one may be trained to produce an audio spectrogram, and another uses the spectrogram to produce a waveform. Other ways of dividing the work of speech synthesis between different neural and expert-designed models are possible. FIG. 4A illustrates an exemplary embodiment 400 of the custom voice system 222 showing additional components in accordance with various embodiments. In this example, custom voice system 222 represents an example two-piece inference model for configurating neural speech synthesis and includes feature model 402 and vocoder 404. In an embodiment, high-level feature model 402 takes as input text to be converted to speech audio and one or more voice property values. It produces a spectrogram of speech as output. A vocoder 404 takes as input the spectrogram and produces synthesized speech audio as an output that can be stored in synthesized audio data store 312 or other appropriate data store, and/or otherwise utilized. FIG. 4B illustrates example 420 of spectrogram 422 of speech audio produced by high-level feature model 402 and used as input to a vocoder 404.

Discriminator

In an embodiment, one example of neural speech synthesis uses a discriminator as part of the training process. The discriminator takes in an audio sample sourced from a corpus of training audio samples and computes a probability of it being associated with one or more specific labels. In some examples, the discriminator is a model trained using machine learning such as a neural network, supervised or semi-supervised training can be possible. It is also possible to use an expert-designed model that is not trained from data.

Figure 5:
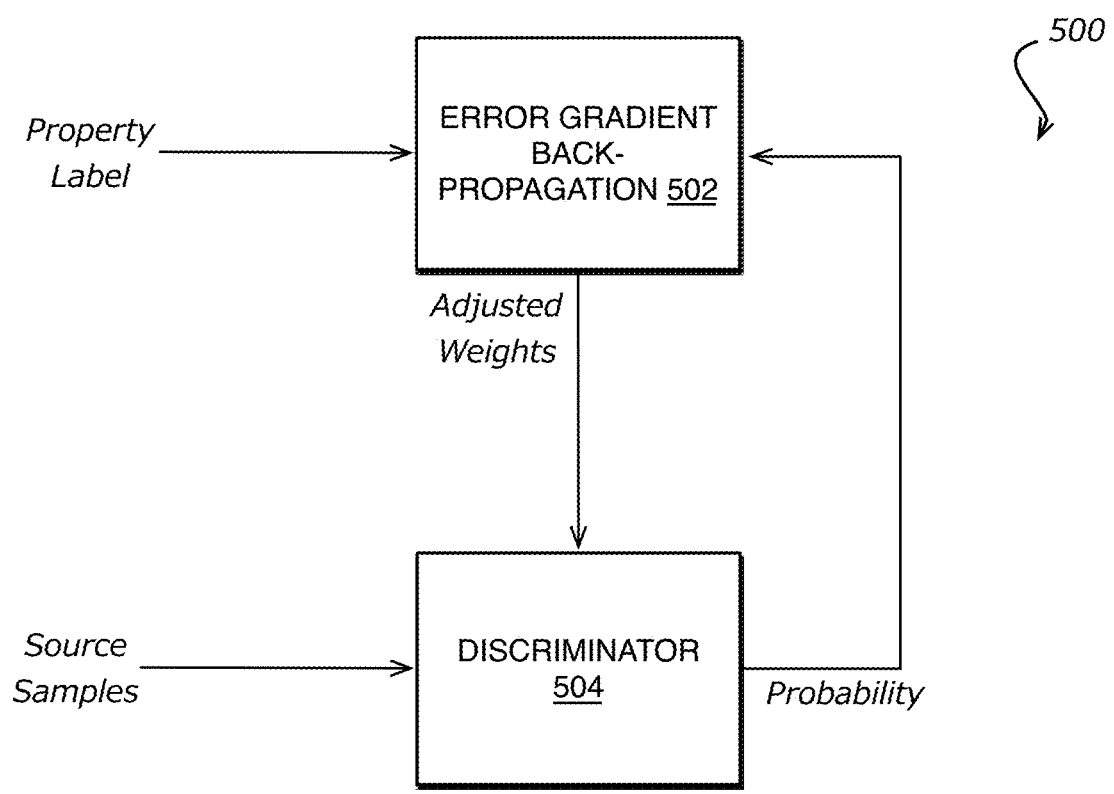
FIG. 5 illustrates an example process for training a voice property discriminator in accordance with various embodiments.

FIG. 5 illustrates example 500 of a system of training a discriminator neural network model 504. In this example, the training includes a process of obtaining source samples of speech audio (e.g., voice data from an individual such as a voice donor or machine-generated voice data from a TTS system or other audio generation system) labeled with discrete values of one or more voice properties (not shown). An initial discriminator model 504 processes the source samples to compute a probability for one or more of the voice properties. A training process 502 compares the computed probability with the actual property label associated with the source sample using a loss function represented as:

$$\text{loss} = \text{probability of property} - \text{Boolean property label} \qquad \text{Eq. (1)}$$

It should be noted that other loss functions are possible, such as ones that sum the loss of multiple properties. Such sums could be weighted based on the relative importance of each property. Other mathematical functions in the loss function may be appropriate for specific system constraints.

The training process 502 proceeds to compute, for parameters of the discriminator neural network, error gradients. It is not strictly necessary to compute a gradient for each parameter. The training process 502 proceeds to apply adjustments to the weights of the discriminator model 504 according to the gradients. The amount of adjustment can be scaled by a factor that controls the learning rate. Various other machine learning techniques for training neural networks are possible.

Different source samples will produce different probabilities within the range of 0 to 1. A trained discriminator may tend to produce output values as being between 1 to 0, advantageously providing diversity of output probabilities. For example, if diversity is low, some experimentation with removing a SoftMax output or having independent sigmoid outputs for different properties can be helpful. Limiting the amount of training, and therefore the prediction certainty, can also be helpful. The requirements may be application specific.

Transfer Training

A trained neural speech synthesis model can be a baseline model, which can be adapted to vary based on parameter input values as expected by users. Training neural speech synthesis models, such as Tacotron and its progeny, can use a loss function that compares model output to source training samples. This can be done, for example, by comparing spectrograms with a loss function such as one represented by:

$$\text{loss} = \text{sum over bins(abs(recording spectrogram bin} - \text{speech spectrogram bin))} \quad \text{Eq. (2)}$$

Mean squared error or other alternatives to an absolute value are appropriate for some models and applications.

Figure 6:
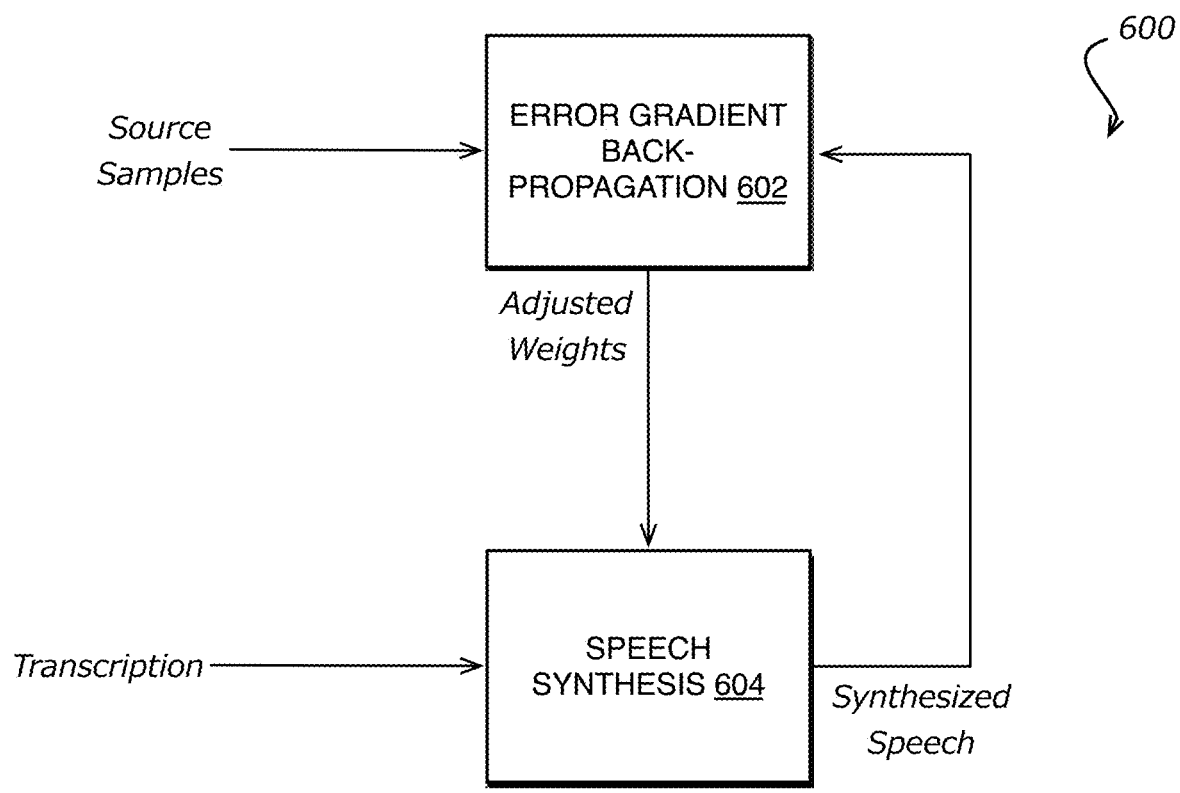
FIG. 6 illustrates an example process for training a speech synthesis model on transcribed speech in accordance with various embodiments.

FIG. 6 illustrates example 600 of training a baseline neural speech synthesis model 604 in accordance with various embodiments. In this example, the speech synthesis model 604 takes in transcriptions of training speech audio samples and produces synthesized speech audio as output. A training process 602 compares the synthesized speech with the source training audio sample using the loss function above. Other loss functions are possible and appropriate for other applications.

In an embodiment, the training process 602 proceeds to compute an error gradient for each parameter of the speech synthesis model 604. In certain embodiments, a gradient for selected parameters are computed. The training process 602 proceeds to apply adjustments to the weights of the speech synthesis model 604 according to the gradients. The amount of adjustment can be scaled by a factor that controls the learning rate. In certain embodiments, the factor is dynamic. For example, the factor can be based on one or more performance metrics. Various other machine learning techniques for training neural networks are possible in accordance with embodiments described herein.

A pre-trained baseline speech synthesis model generates a particular voice for the speech that it synthesizes. For example, a target voice with a general accent, middle to young age, and neutral sounding gender may be preferred. After having pre-trained a baseline speech synthesis model, it is possible to perform transfer training by training an improved speech synthesis model that has one or more additional input nodes to the neural network, the nodes indicating voice property values. This can enable the speech synthesis model to learn how to adapt the sound of the synthesized voice according to the voice property values.

Figure 7:
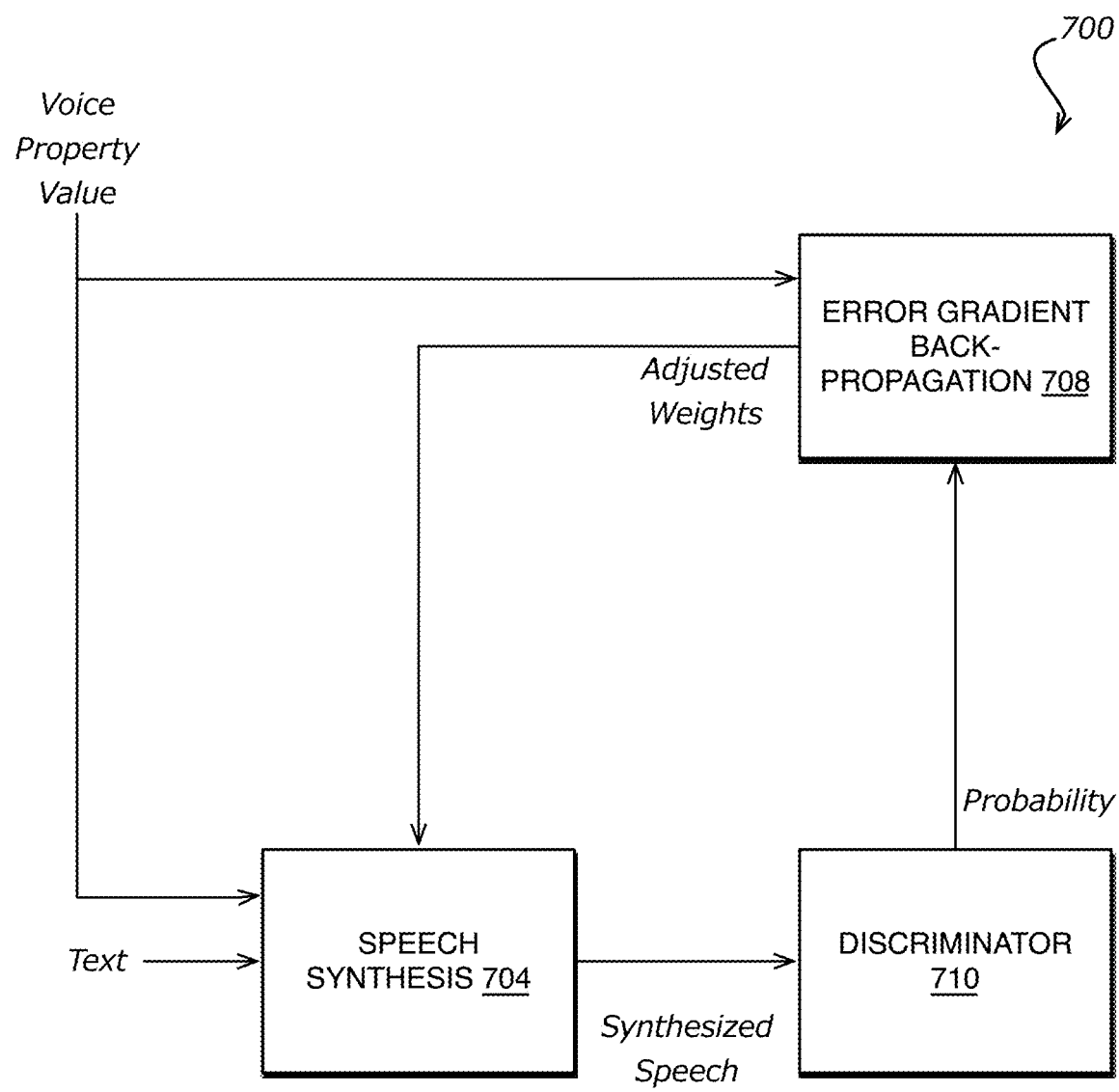
FIG. 7 illustrates an example process for training a configurable speech synthesis model in accordance with various embodiments.

For example, FIG. 7 illustrates example 700 of transfer training in accordance with various embodiments. In this example, a configurable speech synthesis model 704 takes as input a voice property value and text. Voice property values may be chosen in a pattern or randomly. In an embodiment, the voice property values can be compared to a diversity threshold to generate a diverse set of voice property values. The speech synthesis model 704 outputs synthesized speech audio. A discriminator 710 trained as described above as shown in FIG. 5, obtains the synthesized speech audio and computes a probability. A training process 708 compares the probability computed by the discriminator 710 to the voice property value using a loss function represented by:

$$\text{loss} = \text{probability of property} - \text{voice property value} \quad \text{Eq. (3)}$$

This has an effect equivalent to minimizing the cross-entropy loss between two models, where, effectively, the output of one of the models is defined by the voice property values. It should be noted other loss functions are possible in accordance with embodiments described herein. The training process 708 proceeds to compute an error gradient for parameters of speech synthesis model 704. For example, training process 708 computes an error gradient for one or more parameters. Training process 708 proceeds to apply adjustments to the weights of the speech synthesis model 704 according to the gradients. The amount of adjustment can be scaled by a factor that controls the learning rate. Various other machine learning techniques for training neural networks are possible in accordance with various embodiments.

Joint Training

Rather than pre-training a baseline neural speech synthesis model and using transfer training to turn it into a configurable neural speech synthesis model, it is possible to train a model jointly to simultaneously learn speech synthesis in general and configurability according to voice parameters.

Figure 8:
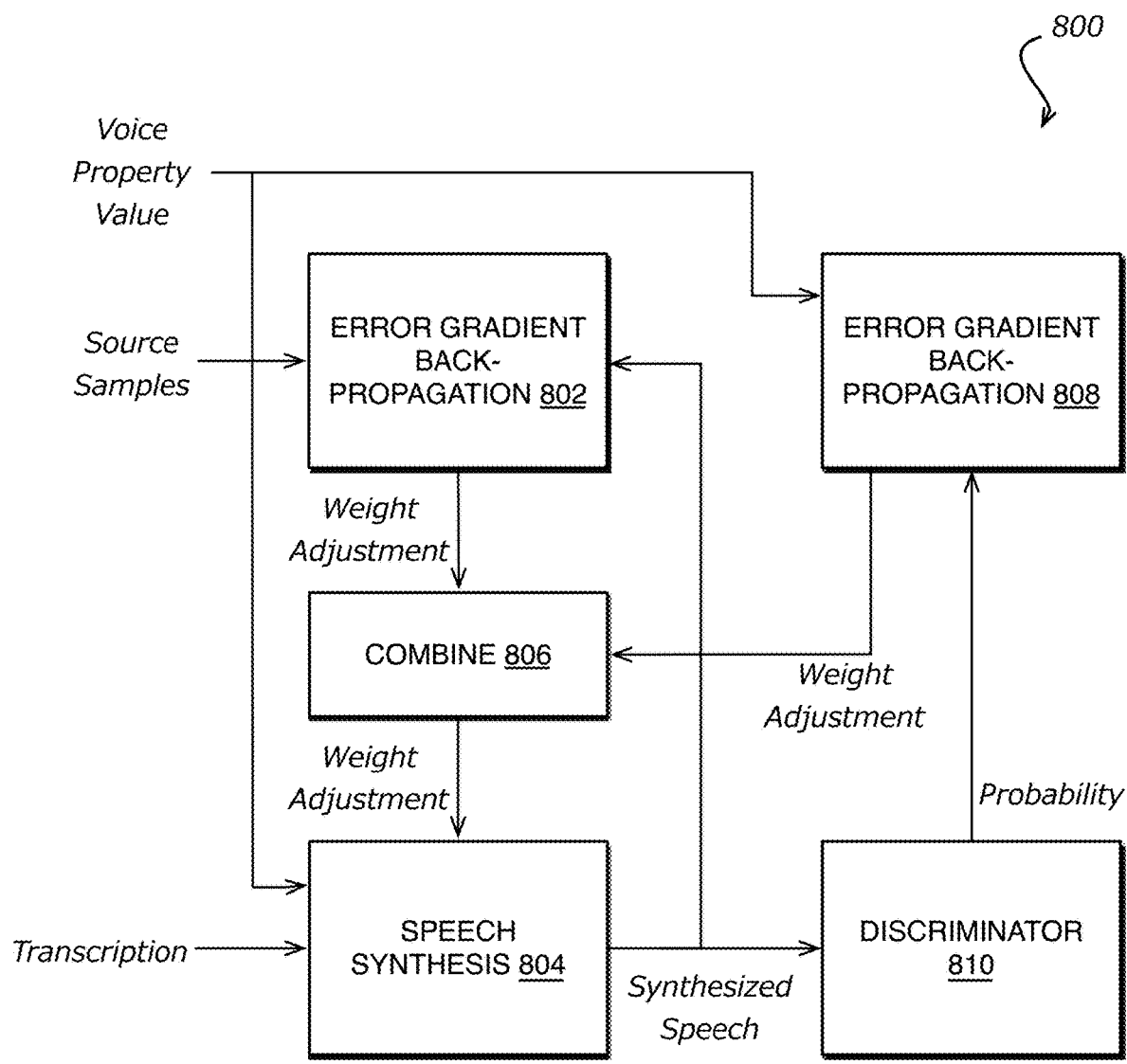
FIG. 8 illustrates an example process for jointly training a speech synthesis model on discriminated voice property values and transcribed speech in accordance with various embodiments.

FIG. 8 illustrates example 800 of jointly training configurable neural speech synthesis. A configurable neural speech synthesis model 804 takes in transcriptions of source training audio samples and one or more voice property values on a continuous scale. In certain embodiments, voice property values are related to the source samples of speech audio (e.g., voice data from an individual such as a voice donor or machine-generated voice data from a TTS system or other audio generation system). In an embodiment, voice property values are disjoint from the source samples. The configurable neural speech synthesis model 804 outputs synthesized speech.

Training process 802 compares the synthesized speech with the source training audio sample corresponding to the text transcription. Training process 802 proceeds to compute a loss value and/or weight adjustment according to an error gradient for parameters of the speech synthesis model 804.

Discriminator 810, trained as described above in FIG. 5, takes in the synthesized speech audio and computes a probability. Training process 808 compares the probability computed by discriminator 810 to the one or more voice property values. Training process 808 proceeds to compute a loss value and/or weight adjustment according to an error gradient for each parameter of speech synthesis model 804.

A combination 806 of the weight adjustment or computation of weight adjustments from loss values from training process 802 and training process 808 produces a combined weight adjustment according to the loss function represented by:

$$\text{loss} = WS(\text{sum over bins}(\text{abs}(\text{recording spectrogram bin} - \text{speech spectrogram bin}))) + WP(\text{probability of property} - \text{voice property value}) \quad \text{Eq. (4)}$$

where WS and WP are relative weightings of the effect of voice property value matching and training sample voice matching. This has the effect of training a synthesis model that can generate sounds according to voice property values but not learning to generate an undesirable output or other output signal satisfying the voice property values without generating the sounds represented by the input text.

In an embodiment, during a manual approach, the relative weightings that give the most accuracy per training time can be determined through experimentation. Additionally, or alternatively, the relative weightings can be based on one or more performance metrics or other such factors. The combined weight adjustment is applied to the weights of the speech synthesis model 804 according to the gradients. The amount of adjustment can be scaled by a factor that controls the learning rate. Various other machine learning techniques for training neural networks are possible.

The result is a speech synthesis model 804 that can take in text and one or more voice property values that the model 804 has learned and produce synthesized speech audio with a voice as defined by a user's setting of the voice property values.

Synthesis Using the Model

In an embodiment, a service of synthesizing speech audio from text and a vector of voice property values for a specific desirable voice is provided. This is useful, for example, to create pre-recorded messages for a telephone service interactive voice response (IVR) menu with menu messages such as "to continue in English, press 1" or "to check your account balance, press 2". It is also useful for pre-recorded messages in devices such as voice interactive web sites, mobile apps, advertisements, robots, or automobiles with messages such as "opening windows" or "as you wish". The voice, and its configuration, create a brand identity that users and consumers recognize.

The configuration operations can be provided through an application programming interface (API) that gives user-controlled access to the synthesis operation on a server across a network. The synthesis can be performed directly or locally. An API request or local function call can take as arguments relevant voice parameters such as accent, vocal tract parameters such as deepness, and attitudes such as speed or excitement level.

Figure 9:
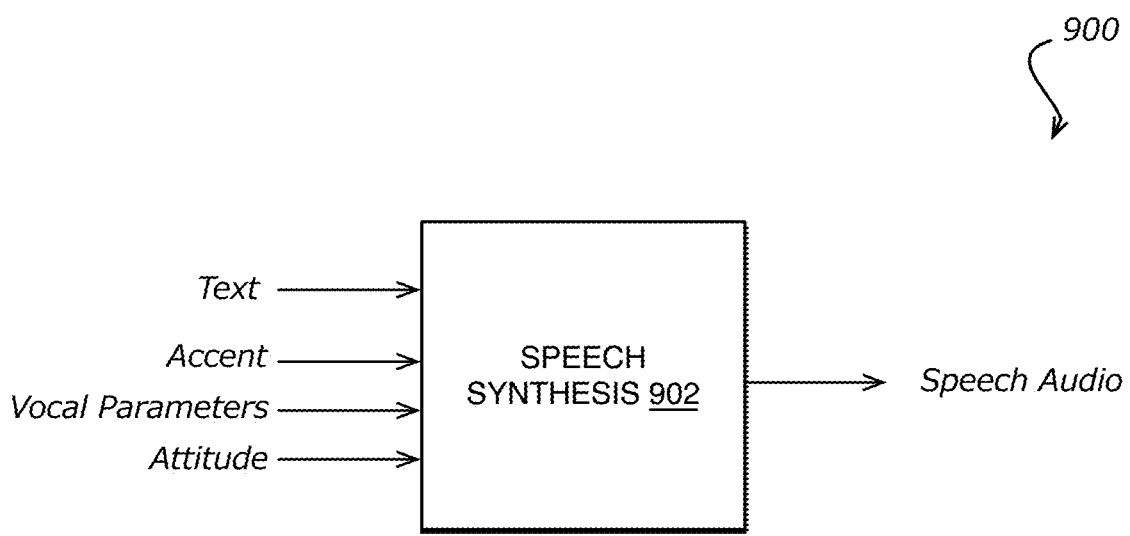
FIG. 9 illustrates an example configurable neural speech synthesis model trained on multiple voice properties in accordance with various embodiments.

FIG. 9 illustrates example 900 of a functional speech synthesis engine 902. Speech synthesis engine 902 takes, as input, a plurality of inputs including, for example, text of a speech segment to synthesize, an accent parameter value, a vocal tract parameter value, and an attitude parameter value. A request for synthesized speech is received. In response, speech synthesis engine 902 generates an output with speech audio. In an embodiment, the output could be a stream or a file in a format such as wave (WAV), Speex, Free Lossless Audio Coding (FLAC), or Motion Picture Expert Group Layer 3 (MP3).

A user, such as a system engineer, or a higher-level function that calls the speech synthesis engine 902 can then incorporate the audio samples into a product. Providing a configurable speech synthesis service may be part of a company's business model in which they charge money, for example, per-message, as a subscription, per-project, or in per-unit royalty agreement.

Users may call a speech synthesis function using a command line program such as one in a Linux shell or a software development environment in Linux®, Macintosh®, or Windows®. It is also possible to provide a web or browser-based graphical user interface (GUI) for system designers to synthesize speech audio with values of configurable speech parameters.

Figure 10:
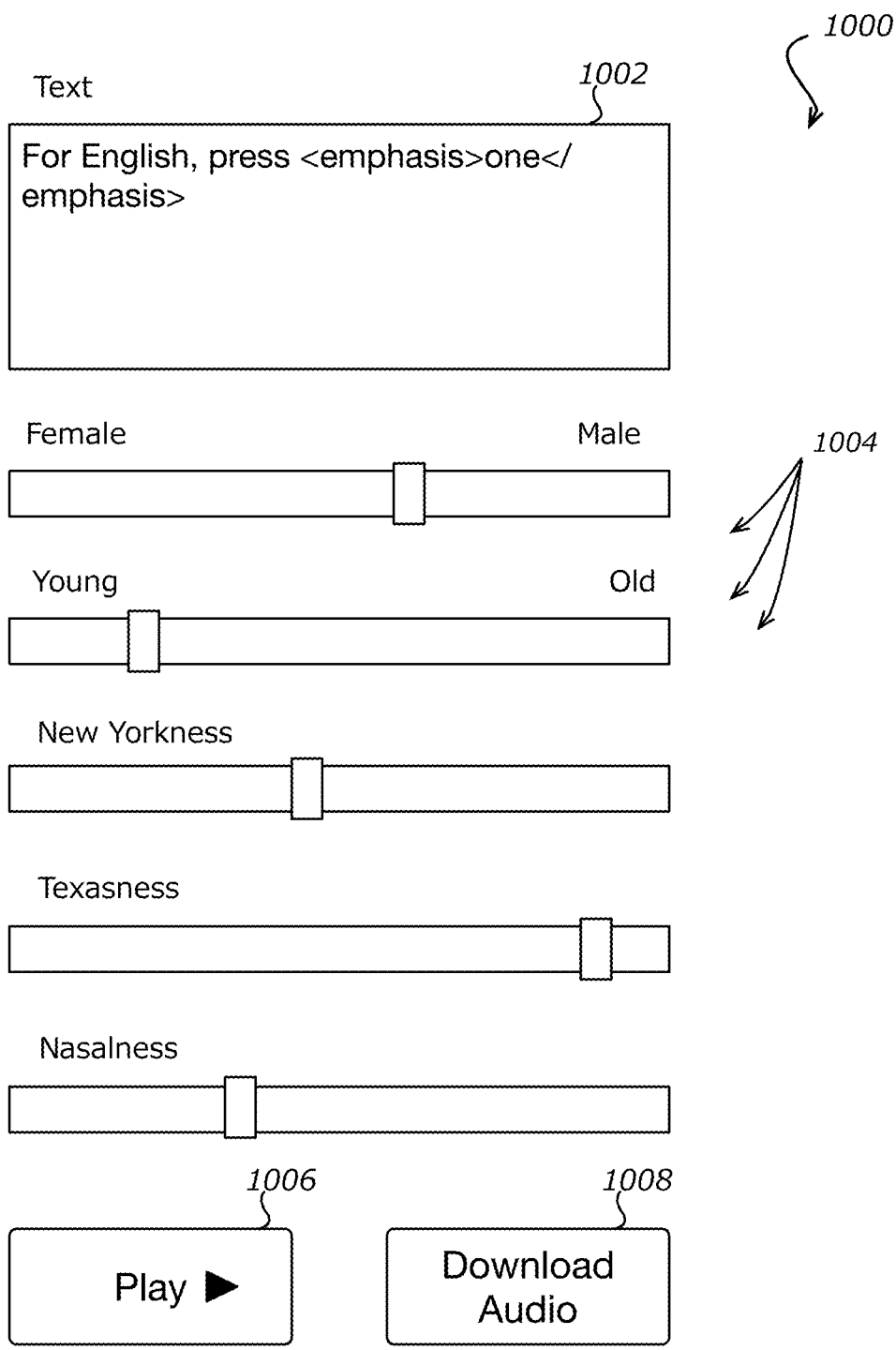
FIG. 10 illustrates an example interface for configuring and synthesizing speech audio in accordance with various embodiments.

For example, FIG. 10 illustrates example 1000 of a GUI for synthesizing speech audio from text according to configurable parameters in accordance with various embodiments. In this example, the GUI includes a text entry box 1002 for a user to enter text to synthesize. The text can include, for example, tags in the SSML language such as tags to indicate words to be spoken with emphasis. The GUI includes slider bars 1004 that define parameter values based on how far a graphic of a slider is between its left and right extreme. Conventionally, left is a small value, and right is a large value. It should be noted that any graphic may be employed in accordance with various embodiments, including, for example, a graphic of a knob or dial, numerical text entry box, or other numerical input methods or combinations of methods different for different parameters or multiple controls with different methods synchronized such as a slider that changes a value in a numerical text entry box.

Sliders in the GUI of FIG. 10 can be labeled. Some are labeled on the left and right to give names to the extreme ends such as Female and Male. Some sliders have a single label, such as New Yorkness, that indicates an amount of a single type of parameter value. The GUI of FIG. 10 has 5 sliders that define parameter values for gender, age, amount of a New York type of accent, amount of a Texas type of accent, and prominence of a Nasal sounding vocal tract. A user can independently configure each parameter. Some systems may enforce dependencies between parameters, such as having an increase in the New Yorkness parameter force a corresponding decrease in the Texasness parameter.

After configuring a set of parameters 1004, a user can select a play button 1006 to hear a sample of some or all of the text synthesized into speech audio played from the browser. This allows experimentation with the sound of the voice before committing to a final output audio file. Some systems only synthesize and play a portion or multiple non-contiguous portions of the entered text to make it difficult for a user to capture and save the playback sample without paying for the custom-configured synthesized audio.

After a user is satisfied with the sound of the voice that they have configured, they may select a button 1008 to download a file with the synthesized speech audio of their input text. In an embodiment, a charge or other consideration may be debited for the download according to some business models.

Configuring a Speech Synthesizer

Some developers of computerized applications and embedded systems such as automobiles, robots, smart speakers, appliances, and servers provide voice interfaces for such systems that require an ability to generate speech audio for essentially any words at essentially any time that it is needed to provide a user experience. To provide a desired brand voice, such systems can utilize a speech synthesis engine configured for their specific voice but not configurable for any other voice. In other words, a speech synthesis engine that is locked to a custom voice configuration is "frozen" with locked voice property values. A frozen or locked voice property value is a voice property value that remains the same or constant. Speech synthesis technology providers can support that by providing speech synthesis engines generated with selected voice property parameter values and configured by a configurator interface.

A configurator can be provided through an application programming interface (API), a software development kit (SDK) or similar methods. The configurator can provide user-controlled access to the synthesis operation on a server across a network. In certain embodiments, the configurator can be provided directly or locally. An API request or local function call may take as arguments relevant voice parameters such as accent, vocal tract parameters such as deepness, and attitudes such as speed or excitement level.

A user, such as a system engineer, or a higher-level function can then incorporate the generated speech synthesis engine into a product. In an embodiment, providing a speech synthesis engine configurator service may be part of a company's business model in which they charge money for example per-message, as a subscription, per-project, or in per-unit royalty agreement.

Voice designers may access a configurator using a command line program such as one in a Linux® shell or a software development environment in Linux®, Macintosh®, or Windows®. It is also possible to provide a web or browser-based graphical user interface (GUI) for system designers to configure a speech synthesis engine.

Figure 11:
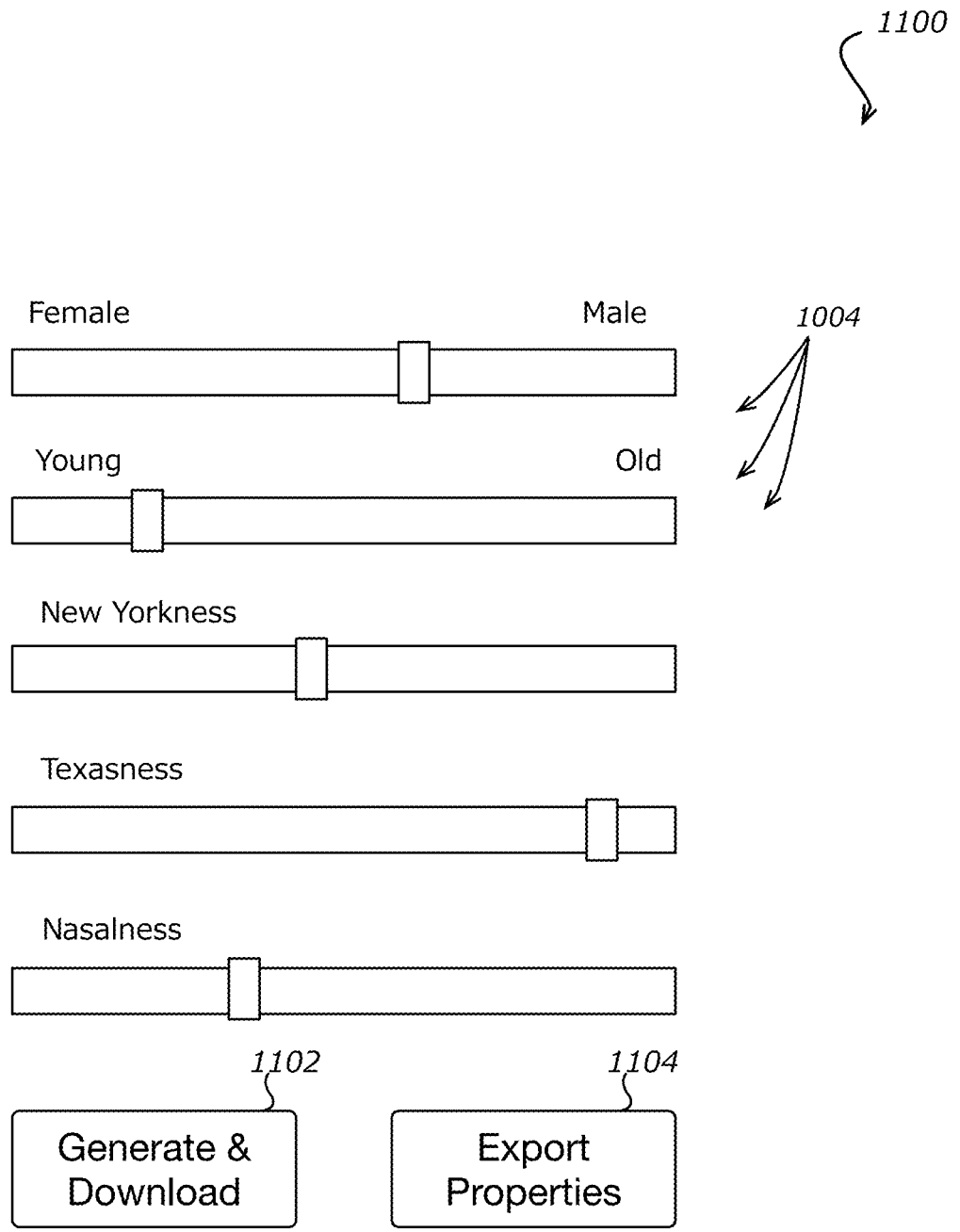
FIG. 11 illustrates an example interface for configuring and generating a speech synthesizer in accordance with various embodiments.

FIG. 11 illustrates example 1100 of a GUI configurator for generating a speech synthesis engine with a voice fixed according to configurable parameters in accordance with various embodiments. In this example, the configurator GUI has the same slider bars 1004 for the same voice parameters and constraints as in the speech synthesizer GUI of FIG. 10. As in FIG. 10, the configurator GUI of FIG. 11 may additionally have a text entry box and play button to assess the sound of a voice configuration. These are not shown in FIG. 11. After a user is satisfied with the sound of the voice that they have configured, they may press a button 1102 to invoke a function that generates the speech synthesis engine and provides it as a file to download. In an embodiment, they may be charged for the download according to some business models.

The speech synthesis engine may be provided as an executable binary, as human-readable programming code in a language such as Python, or as a neural network architecture parameter set for use by standard neural network software. Some generated speech synthesis engines that are delivered as executables or source code may support SSML tags or other dynamic tags to affect the sound of synthesized speech.

Freezing Voice Parameters

After a user requests that the system generates a speech synthesis engine with a frozen set of voice parameters, the method of generation starts by treating the voice parameter values as a set of neural network input features to a neural network trained to be configurable according to the voice values. The system then treats those input values to the network as constants and forward propagates the constants into the hidden layer(s) of the neural network. Whereas the speech synthesis engine 902 for FIG. 9 takes text and voice parameters (accent, vocal tract parameters, and attitude) as input, the text would remain a variable input, but the voice parameters would be constant.

Each node of the first hidden layer comprises an activation function fed by a sum of input parameters multiplied by weights. The weights are learned from the training process of the speech synthesis neural network such as the processes described in FIG. 6, FIG. 7, and FIG. 8. The voice parameter values are multiplied by their respective parameter weights in the configuration method, added together, and included as a constant bias amount within the node. If hidden layers other than the first have inputs directly from input voice property parameters, they can be configured in the same way.

The result is a neural network comprising one or more inputs for text but no inputs for the frozen voice parameters. The multiplications, additions, and activation functions in appropriate combinations may be provided as human-readable source code in a language such as Python and/or in a framework such as TensorFlow. They may be compiled into an executable. Before the compiling or as part of the compilation process, hardware-architecture-specific optimizations may be performed such as parallelizing functions to make use of single instruction multiple data (SIMD) instructions within high-performance general-purpose processors and digital signal processing (DSP) processors or may be divided as appropriate for the processing elements within graphics processing units (GPU).

Sets of voice properties constitute a voice vector. The speech configurator of FIG. 11 allows the user to select a button 1104 to save a vector of voice properties. The properties used to freeze the speech synthesis engine in the configuration process may be saved as plain text, XML, JSON, or other appropriate standard or a proprietary format for representing parameter values. Likewise, the voice property values used to synthesize speech in the GUI of FIG. 10 can be saved similarly. Such a button is not shown in FIG. 10.

Voice Copying

Another possible service and method is to accept, through a user interface, a recording of speech by a person with a voice that has approximately the sound desired for a product identity. A system can process the recordings using a discriminator such as the discriminator 504 trained in the example of FIG. 5. The discriminator outputs a vector of probabilities that can be the values used to start the process of voice configuration or configured synthesis. A large amount of speech is usually best, or at least an amount satisfying a threshold amount of speech, but as few as several sentences may provide enough information for an acceptably accurate set of voice parameters for starting the experimentation needed for branding.

Avatars

Some end-user systems that provide configurable neural speech synthesis present a visual character to the user. Such a character may appear as an avatar, hologram, or other graphically generated display of a character that can speak. Users may interact with the system through typing, mouse-clicking, touch, gestures, or voice control. The user may configure the character that they see. The configuration may be done through a menu, keyboard commands, or voice commands. An example of a menu would look similar to that of FIG. 10 or FIG. 11 but without a download button. An example using voice commands would be for the user to speak a command such as, "Can you increase the Texasness by 20%?". The system recognizes the speech as a natural language command to increase a Texasness voice parameter input to a neural speech synthesis engine. As described above in other examples, age, gender, accent, etc. are types of parameters that may be configurable by users in some systems. Users may perform such configurations by invoking a menu or by speaking directly to the animated character that corresponds to the synthesized voice being configured. This could be invoked with a voice command such as, "Hey Buddy, calm down and drop the New York accent."

Brand Differentiation

A provider of voices may maintain a database. Also, or instead, an industry-standard body may maintain a database or one or more national trademark offices may maintain a database. The database being one that stores voice vectors that produce voices associated with brands. The database can be used to ensure that no two brands have the same voice or voices that are confusingly similar. However, it may be permissible for different brands to use similar voices as long as the brands are for different classes of goods and services.

Figure 12:
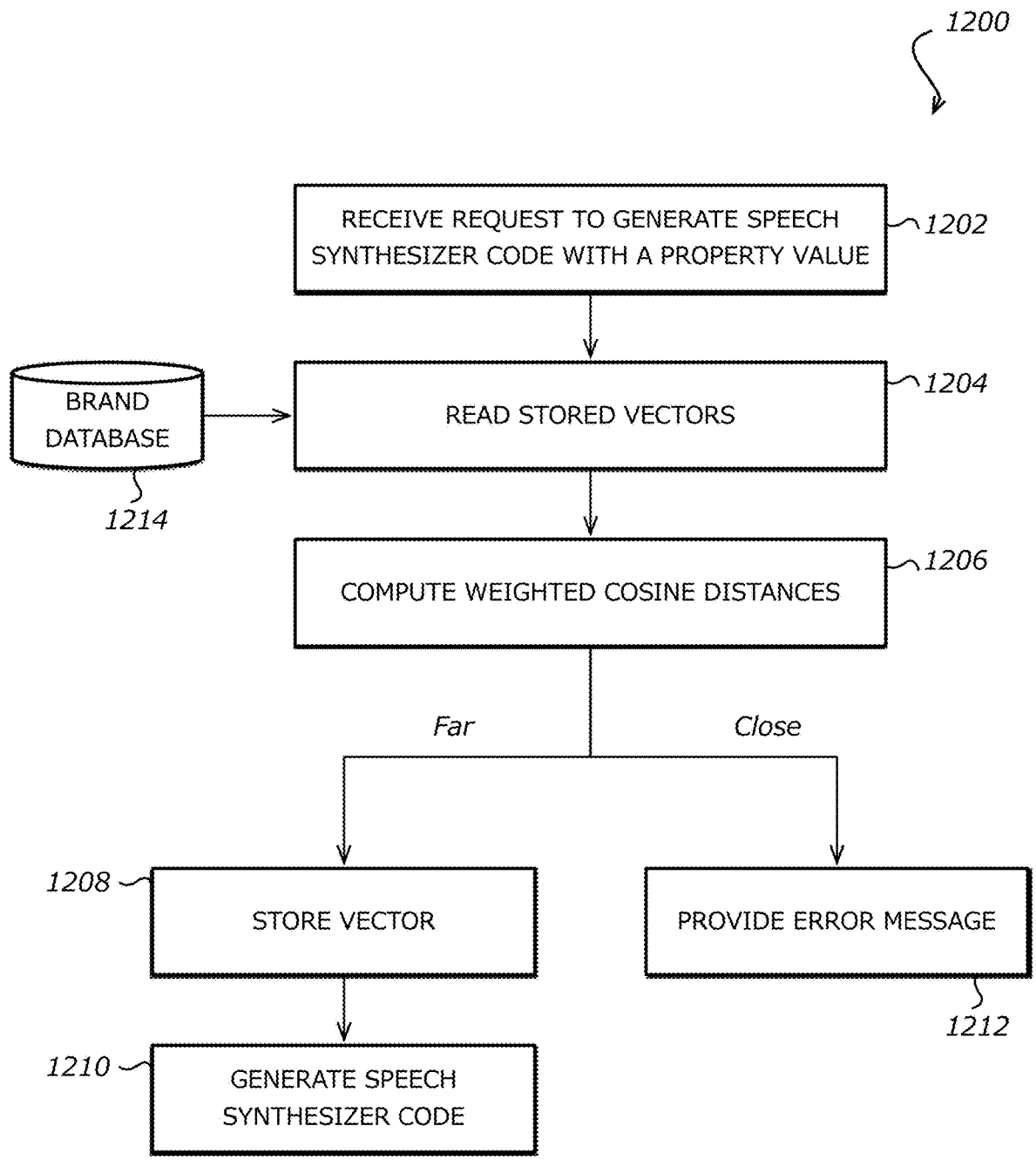
FIG. 12 illustrates an example process for ensuring distinct voices for brands in accordance with various embodiments.

FIG. 12 illustrates an example process 1200 for ensuring that brands have distinct voices. The method begins with a step 1202 of receiving a request to synthesize speech or generate a speech synthesis engine with a specific voice property vector. The method proceeds to a step 1204 of reading one or more stored vectors from a brand database 1214. In a next step 1206 the method computes a cosine distance between the requested voice property vectors and the one or more voice property vectors read from the brand database 1214. The computation of the cosine distance may give different weights to different properties since some properties of a voice have a greater influence on brand perception than other properties.

If the smallest cosine distance of the requested voice property vector to voice property vectors from the brand database 1214 is below a threshold distance, the method proceeds 1212 to provide an error message. It may then proceed to the step of receiving a voice property vector 1202 for a new voice property vector. If the smallest cosine distance is above the threshold distance, the method may proceed to a step 1208 of storing the requested voice vector in the brand database 1214 so that it may be compared to future requested voice vectors. After storing the requested voice vector, the method may proceed to a further step 1210 of generating code for a speech synthesizer. Additionally, or alternatively, the method may proceed to synthesize input text in the voice defined by the requested voice property vector. There may be other intermediate steps within implementations of the method of FIG. 12.

It is also possible to store in the brand database 1214 an allowable distance of exclusivity associated with each brand's voice property vector. Accordingly, the threshold for comparison is based on the exclusivity distance associated with each brand's voice property vector. Brand owners may pay to have a larger exclusivity distance. That will give them a more distinct voice.

The allowable distance may be dynamic. For example, the allowable distance may depend on the distance between goods and services within the same or different classes. For example, goods and services within the same or similar class may be associated with stricter thresholds than goods and services in different classes.

Trademark Examination

It is in the public interest for consumers to be able to identify the source of goods and services. Most major countries of the world have legal systems to prevent passing off of goods and services. To support the enforcement of the uniqueness of identifiers of goods and services, such countries keep registries of trademarks. These can include names, descriptive words, logos, distinguishing colors, and sounds. As we enter an era of voice-enabled goods and services, where the voices are distinctive to brands, it is desirable to register voices as trademarks. Such voices can be defined with voice property vectors as described above. To ensure that an application for trademark registration is requesting an appropriately distinctive trademark, it is necessary to examine trademarks. However, a problem arises in the fact that it is difficult for a human examiner to compare a voice specified in a trademark application with other existing voice trademarks.

Figure 13:
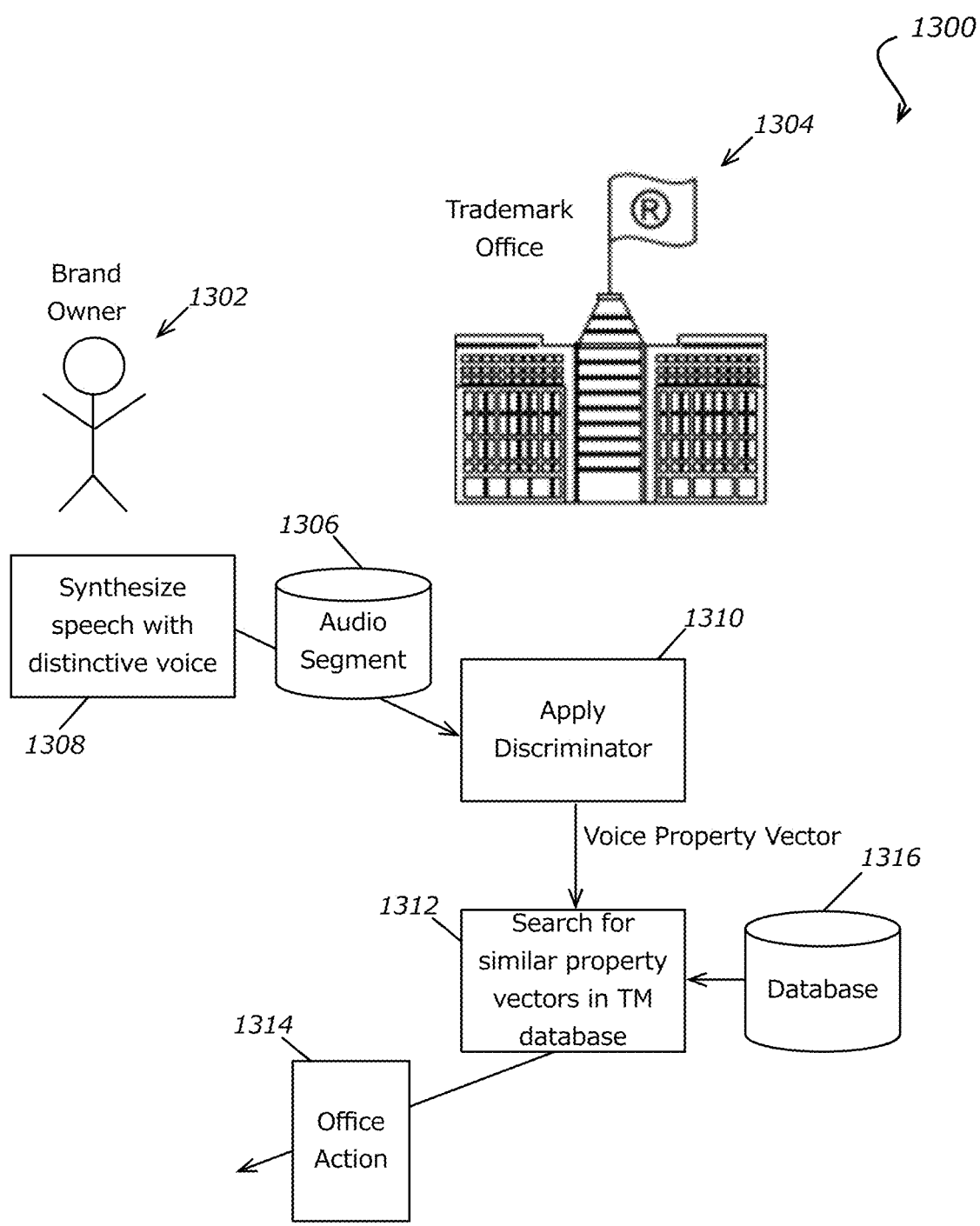
FIG. 13 illustrates an example process for examining trademark registration applications in accordance with various embodiments.

FIG. 13 illustrates example method 1300 for examining voice trademarks in accordance with various embodiments. At first, a brand owner 1302 performs a step 1308 of synthesizing speech with a distinctive voice to produce an audio segment 1306 of speech audio. The brand owner provides the audio segment 1306 to a trademark office 1304. The trademark office 1304 receives the specimen of speech audio with an application for trademark registration. The trademark office 1304 may require a minimum length of speech to be able to distinguish its voice characteristics with sufficient accuracy for examination.

The trademark office 1304 performs a step 1310 of applying a discriminator to the audio segment 1306. A discriminator such as the one shown in FIG. 5 may be appropriate, as it outputs a voice property vector for a plurality of voice property values. The trademark office 1304 proceeds to a step 1312 of searching a database 1316 of registered voice property vectors. The search comprises computing distances between the computed voice property vector of the registration application and other voice property vectors stored in the database 1316. The search may be constrained to voice trademarks within a specified set of classes of goods and services.

If the smallest computed distance between the voice property vector of the audio segment 1306 of the registration application is within a threshold distance of another voice in the database 1316 for a claimed set of goods and services in a matching class then the trademark registration is to be refused. Otherwise, it may be further examined for possible registration. The trademark office 1304 proceeds to prepare an office action 1314 for the brand owner 1302 indicating whether the trademark registration is refused because of similarity to other registered voice trademarks.

Figure 14A:
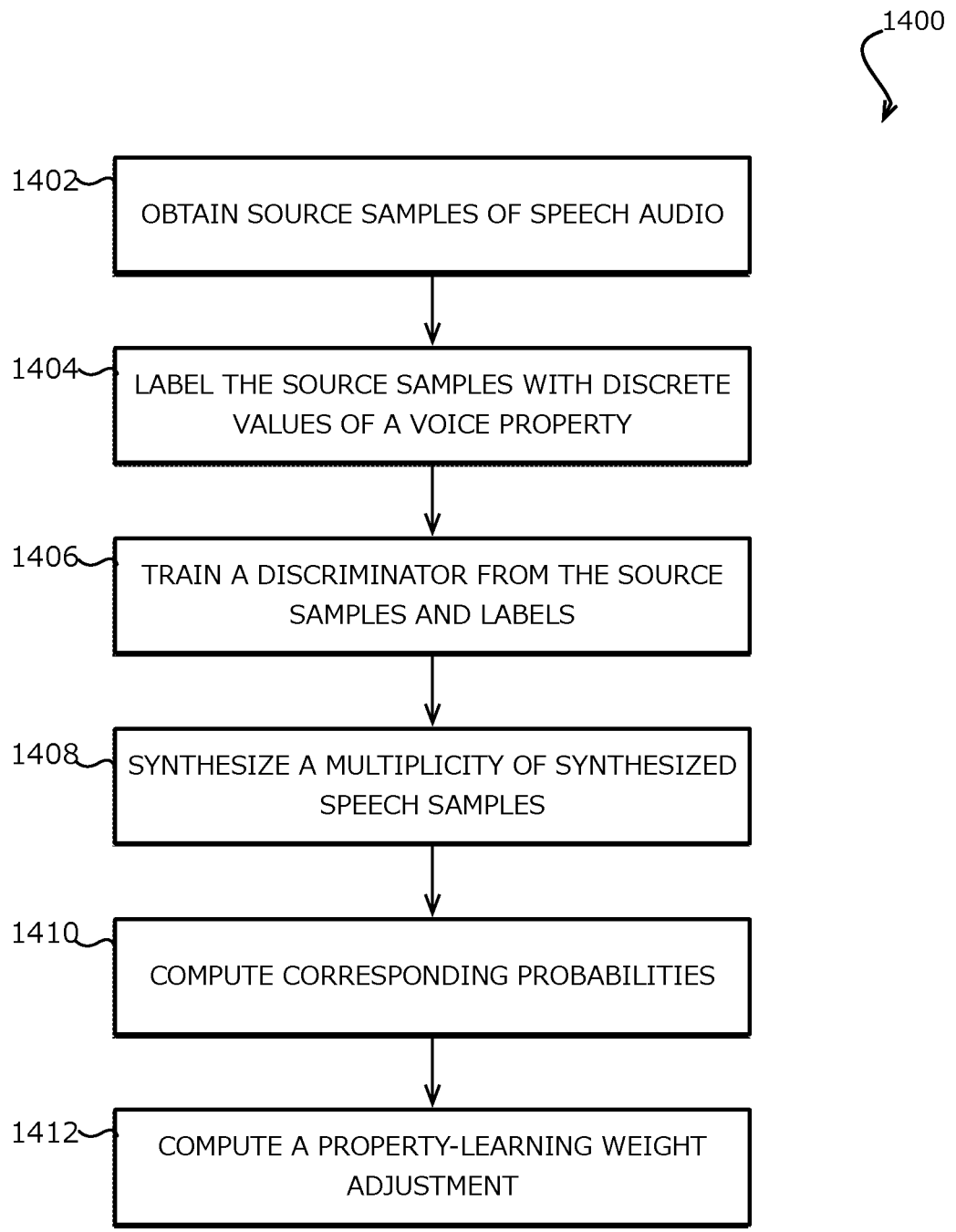
FIG. 14A illustrates an example process for training a speech synthesis model in accordance with various embodiments.

FIG. 14A illustrates an example process 1400 for training a model (e.g., a neural speech synthesis model or a speech synthesis model) that can generate speech audio conditioned on a value of a voice property in accordance with various embodiments. It should be understood that there can be additional, fewer, or alternative steps performed in similar or alternative orders, or in parallel, within the scope of the various embodiments unless otherwise stated. In this example, source samples of speech audio (e.g., voice data from an individual such as a voice donor or machine-generated voice data from a TTS system or other audio generation system) can be obtained 1402. The source samples can be obtained from an individual such as a voice donor or machine-generated voice data. A variety of different methodologies may be used to retrieve the source samples, including but not limited to, data scrapes, API access, etc. The source samples can be labeled 1404 with discrete values of a voice property, including, for example, a gender voice property, an age voice property, an accent voice property, a timbre voice property. Other voice properties may indicate whether the source samples indicate the attitude of the speaker, such as whether the speaker appears happy, sad, calm, excited, formal, casual, etc. A discriminator can be trained 1406 from the source samples and labels. The discriminator is configured to generate a probability value that quantifies the likelihood of the voice property from a sample of speech audio. A model (e.g., neural speech synthesis model or synthesis model) can be trained by synthesizing 1408 a multiplicity of synthesized speech samples using the model with a diverse set of voice property values. In certain embodiments, synthesizing uses a transcription of source samples. In this example, a source-matching weight adjustment is computed by back-propagating changes to minimize a loss function that depends on differences between the source samples and the synthesized speech. Corresponding probabilities can be computed 1410 for the synthesized speech samples using the discriminator.

Thereafter, a property-learning weight adjustment can be computed 1412 by back-propagating changes to minimize a loss function that depends on the difference between the voice property values and corresponding probabilities.

Figure 14B:
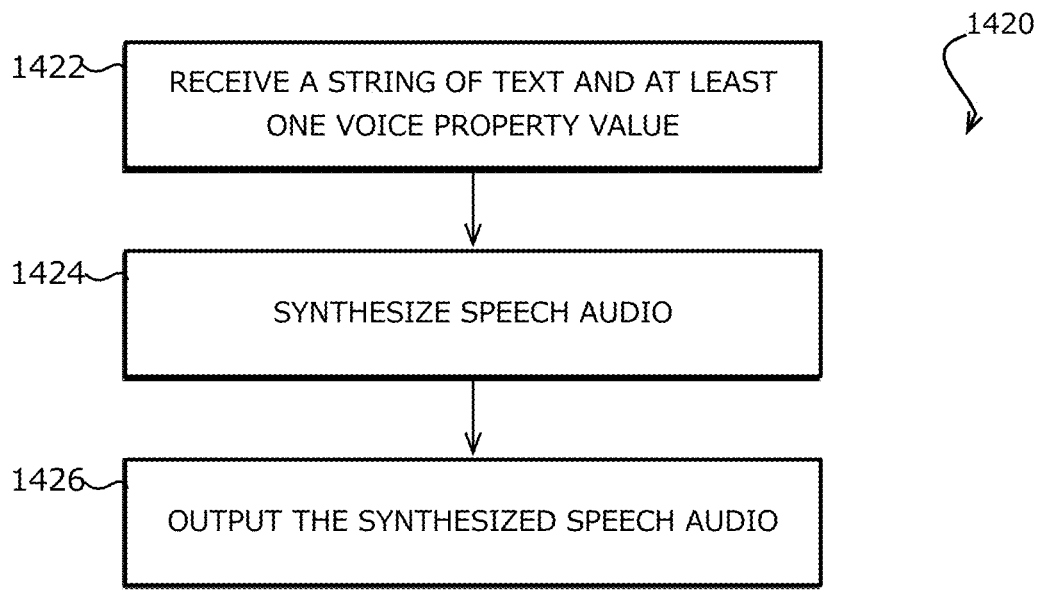
FIG. 14B illustrates an example process for generating synthesized speech in accordance with various embodiments.

FIG. 14B illustrates an example process 1420 for generating synthesized speech using a trained model in accordance with various embodiments. In this example, a string of text and at least one voice property value can be received 1422 at a trained model (e.g., the neural speech synthesis model or synthesis model). The string of text and voice property value can be associated with a perceptible meaning. For example, the voice property values may define voice characteristics such as accents and attitudes. The string of text and voice property values can be received in accordance with embodiments described in FIG. 10. For example, a user may utilize a GUI that includes a text entry box operable for the user to enter text to synthesize. The GUI may further include slider bars or other graphically elements or input fields that can be used to define voice property values. In an embodiment, the string of text can be associated with at least one text tag. For example, the string of text can include tags in the SSML language to indicate words to be spoken with emphasis, allowing for dynamically configurable voice parameter values. Speech audio corresponding to the string of text can be synthesized 1424 using a neural speech synthesis model that conditions a sound of speech audio on the at least one voice property value to generate synthesized speech audio. Thereafter, the synthesized speech audio can be outputted 1426, wherein the sound of the synthesized speech audio perceptually relates to the at least one voice property value. In certain embodiments, outputting the synthesized speech audio may allow for downloading and/or playback of the synthesized speech audio.

Figure 14C:
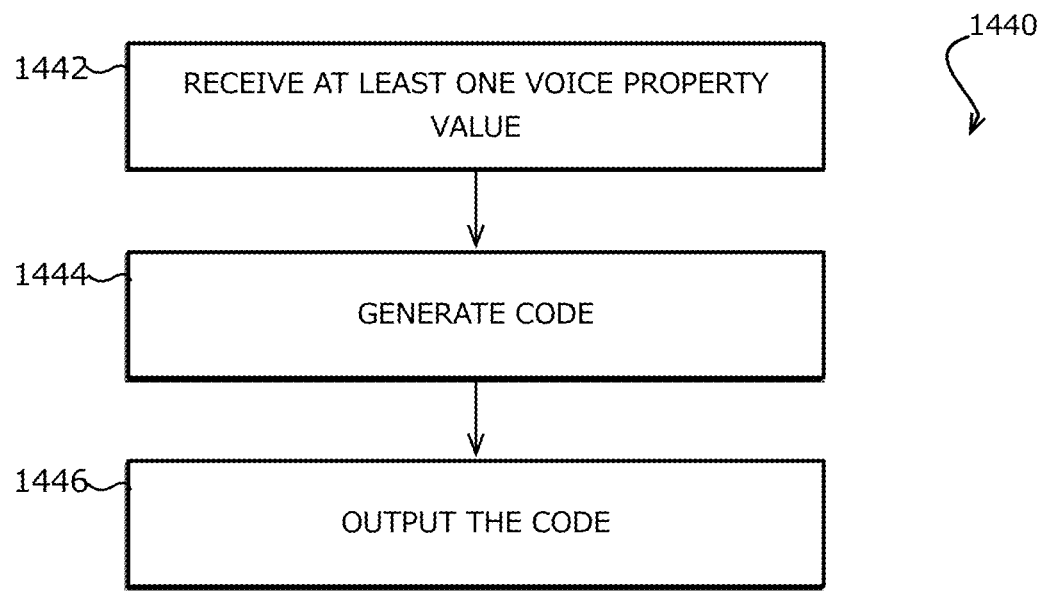
FIG. 14C illustrates an example process for configuring a speech synthesizer in accordance with various embodiments.

FIG. 14C illustrates an example process 1440 for configuring a speech synthesizer in accordance with various embodiments. In this example, at least one voice property value is received 1442. The voice property value in certain embodiments constitutes a voice property vector. Code for execution by a computer is generated 1444. The code can be in a binary format. The code can be configured to implement a neural network wherein a node in a hidden layer includes, in its summation, a constant term derived from a product of the at least one voice property value and a weight learned from a training process. Thereafter, the code is outputted 1446. In an embodiment, the outputted code, when executed, is configured to implement a speech synthesis function within the speech synthesizer. For example, a user, such as a system engineer, can submit a request for synthesized speech, and the received synthesized speech can be incorporated into a product or used for another purpose. In another example, a function call can be received to ensure distinct voices. For example, a request to synthesize speech or generate a speech synthesis engine with a specific voice property vector is received. At least one stored voice property vector from a brand database is read. A distance between the at least one stored voice property vector and the voice property vector is computed. In the situation that the computed distance satisfies a threshold distance, an error message can be generated indicating that the voice closely resembles a stored voice, and it may be desirable to generate a different voice. In the situation that the computed distance fails to satisfy a threshold distance, indicating a distinct voice, the voice property value can be stored in the brand database for use in other purposes.

CRMs

Some examples described above are best performed on servers such as ones in data centers. For example, training of neural networks and hosting of APIs for speech synthesis or synthesis engine generation tend to be performed on servers. The servers run software stored on non-transitory computer readable media.

Figure 15A:
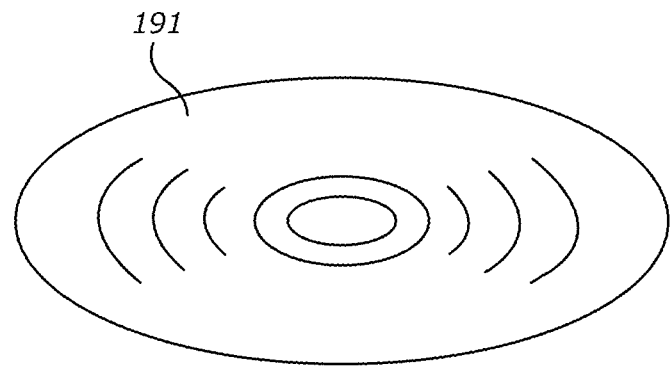
FIG. 15A illustrates an example non-transitory computer readable medium in which aspects of the various embodiments can be utilized.

FIG. 15A illustrates an example non-transitory computer readable medium 191 that is a rotating magnetic disk. Data centers commonly use magnetic disks to store data and code comprising instructions for server processors. The magnetic disk stores code comprising instructions that, if executed by one or more computers, would cause the computer to perform steps of methods described herein. Rotating optical disks and other mechanically moving storage media are possible.

Some implementations described above are best performed on personal computers such as laptops, mobile devices such as mobile phones and tablets, and embedded systems such as automobiles, robots, and appliances. For example, requesting configurable neural speech synthesis through an API, downloading and running speech synthesis engines, and running trademark examination software are best performed on such devices.

The skilled person will be aware of a range of possible modifications of the various embodiments described above. Accordingly, the present invention is defined by the claims and their equivalents.

Figure 15B:
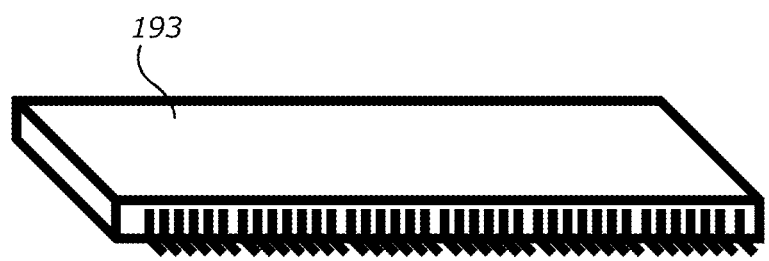
FIG. 15B illustrates an example non-transitory computer readable medium in which aspects of the various embodiments can be utilized.

FIG. 15B illustrates an example non-transitory computer readable medium 193 that is a Flash random access memory (RAM) chip. Data centers commonly use Flash memory to store data and code for server processors. Personal computers, mobile devices, and embedded systems commonly use Flash memory to store data and code for processors within system-on-chip devices. The Flash device 193 stores code comprising instructions that, if executed by one or more computers, would cause the computer to perform steps of methods described herein. Other non-moving storage media packaged with leads or solder balls are possible.

Any type of computer-readable medium is appropriate for storing code comprising instructions according to various embodiments.

The Server

Figure 16A:
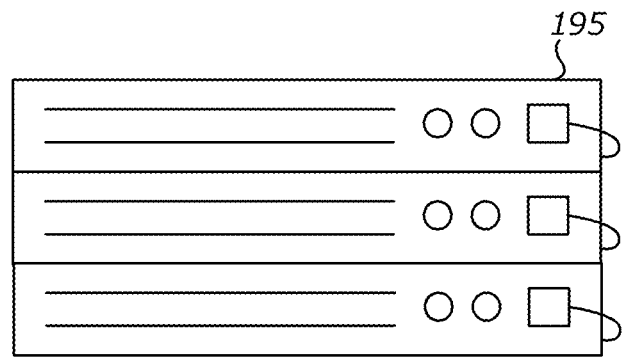
FIG. 16A illustrates an example rack-mounted server computer in which aspects of the various embodiments can be utilized.

Servers, such as ones common in data centers, are often implemented as rack-mounted server blades. They have invisible fans behind cooling openings, blinking lights, and cable connections. FIG. 16A illustrates a rack-mounted server blade multi-processor server system 195. It comprises a multiplicity of network-connected computer processors that run software in parallel.

Figure 16B:
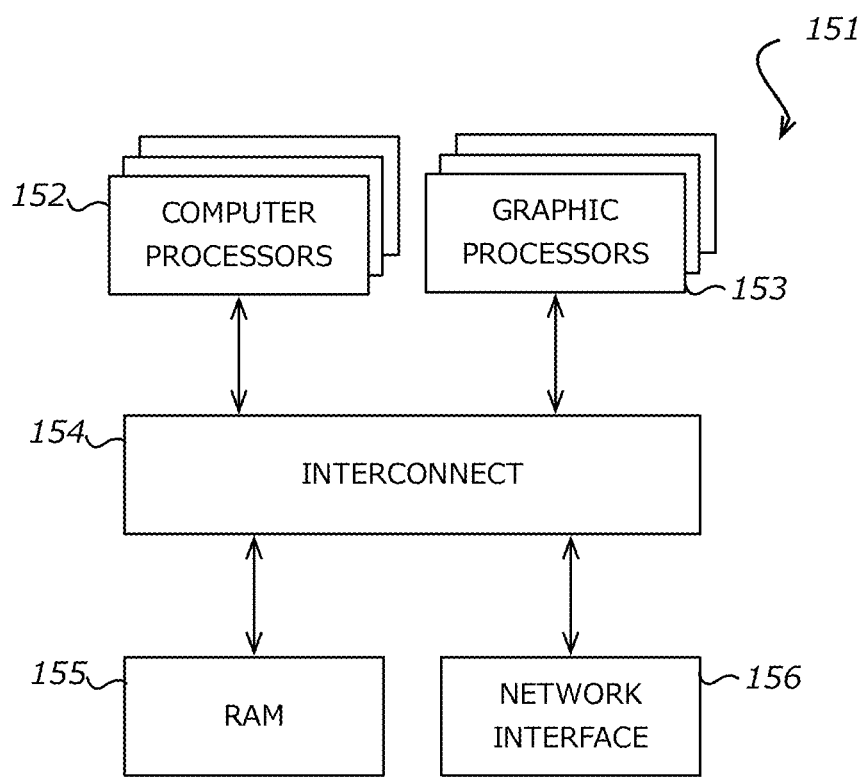
FIG. 16B illustrates an example diagram of a server computer system in which aspects of the various embodiments can be utilized.

FIG. 16B illustrates a block diagram of the server system 151. It comprises a multicore cluster of computer processor (CPU) cores 152 and a multicore cluster of graphics processor (GPU) cores 153. The processors connect through a board-level interconnect 154 to random-access memory (RAM) devices 155 for program code and data storage. Server system 151 also comprises a network interface 156 to allow the processors to access network-attached storage devices comprising non-transitory computer readable media and the Internet. By executing instructions stored in RAM devices 155, the multicore cluster of computer processor (CPU) cores 152 and GPUs 153 perform steps of methods as described herein.

Some embodiments function by running software on general-purpose programmable processors (CPUs) such as ones with ARM or x86 architectures. Some power-sensitive embodiments and some embodiments that require especially high performance such as for neural network algorithms use hardware optimizations. Some embodiments use application-customizable processors with configurable instruction sets in specialized systems-on-chip, such as ARC processors from Synopsys and Xtensa processors from Cadence. Some embodiments use dedicated hardware blocks burned into field programmable gate arrays (FPGAs). Some embodiments use arrays of graphics processing units (GPUs). Some embodiments use application-specific-integrated circuits (ASICs) with customized logic to give the best performance. Some embodiments are in hardware description language code such as code written in the language Verilog.

Some embodiments of physical machines described and claimed herein are programmable in numerous variables, combinations of which provide essentially an infinite variety of operating behaviors. Some embodiments herein are configured by software tools that provide numerous parameters, combinations of which provide for essentially an infinite variety of embodiments of the invention described and claimed.

Hardware blocks, custom processor instructions, co-processors, and hardware accelerators perform neural network processing or parts of neural network processing algorithms with particularly high performance and power efficiency. This provides long battery life for battery-powered devices and reduces heat removal costs in data centers that serve many client devices simultaneously.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the word "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

The invention claimed is:

1. A computerized method of synthesizing speech audio, the computerized method comprising:
   receiving a string of text and at least one voice property value with a perceptible meaning, wherein the at least one voice property value comprises a voice property vector;
   reading at least one stored voice property vector from a brand database;
   computing a distance between the at least one stored voice property vector and the voice property vector to generate a computed distance;
   generating code for execution by a computer, the code implementing a neural speech synthesis model, wherein a node in a hidden layer includes, in its summation, a constant term derived from a product of the at least one voice property value and a weight learned from a training process; and
   outputting the code, wherein synthesizing speech audio corresponding to the string of text using the neural speech synthesis model that conditions a sound of speech audio on the at least one voice property value generates synthesized speech audio wherein the sound of the synthesized speech audio perceptually relates to the at least one voice property value, and wherein the code implements a speech synthesis function of a speech synthesizer.

2. The computerized method of claim 1, wherein the at least one voice property value includes at least one of a gender voice property, an age voice property, an accent voice property, a timbre voice property, or an attitude voice property.

3. The computerized method of claim 1, further comprising:
   enabling download of the synthesized speech audio.

4. The computerized method of claim 1, further comprising:
   enabling playback of the synthesized speech audio.

5. The computerized method of claim 1, wherein the string of text is associated with at least one text tag.

6. The computerized method of claim 1, wherein the string of text indicates dynamically configurable voice parameter values.

7. The computerized method of claim 1, further comprising:
   providing a graphical user interface that includes one of a text input field or a voice property value input field.

8. The computerized method of claim 1, wherein the code is in a binary format.

9. The computerized method of claim 1, further comprising:
   determining that the computed distance satisfies a threshold distance; and
   generating an error message.

10. The computerized method of claim 1, further comprising:
    determining that the computed distance fails to satisfy a threshold distance; and
    storing the at least one voice property value in the brand database.

11. A non-transitory computer readable storage medium storing instructions that, when executed by at least one processor of a computing system, causes the computing system to:
- receive a string of text and at least one voice property value with a perceptible meaning, wherein the at least one voice property value comprises a voice property vector;
- read at least one stored voice property vector from a brand database;
- compute a distance between the at least one stored voice property vector and the voice property vector to generate a computed distance;
- generate code for execution by a computer, the code implementing a neural speech synthesis model, wherein a node in a hidden layer includes, in its summation, a constant term derived from a product of the at least one voice property value and a weight learned from a training process; and
- output the code, wherein synthesizing speech audio corresponding to the string of text using the neural speech synthesis model that conditions a sound of speech audio on the at least one voice property value generates synthesized speech audio wherein the sound of the synthesized speech audio perceptually relates to the at least one voice property value, and wherein the code implements a speech synthesis function of a speech synthesizer.

12. The non-transitory computer readable storage medium of claim 11, wherein the at least one voice property value includes at least one of a gender voice property, an age voice property, an accent voice property, a timbre voice property, or an attitude voice property.

13. The non-transitory computer readable storage medium of claim 11, wherein the instructions, when executed by the at least one processor, further enables the computing system to:
- enable download of the synthesized speech audio.

14. The non-transitory computer readable storage medium of claim 11, wherein the instructions, when executed by the at least one processor, further enables the computing system to:
- enable playback of the synthesized speech audio.

15. The non-transitory computer readable storage medium of claim 11, wherein the string of text indicates dynamically configurable voice parameter values.

16. The non-transitory computer readable storage medium of claim 11, wherein the instructions, when executed by the at least one processor, further enables the computing system to:
- provide a graphical user interface that includes one of a text input field or a voice property value input field.

17. The non-transitory computer readable storage medium of claim 11, wherein wherein the code is in a binary format.

18. The non-transitory computer readable storage medium of claim 11, wherein the instructions, when executed by the at least one processor, further enables the computing system to:
- determine that the computed distance satisfies a threshold distance; and
- generate an error message.

19. The non-transitory computer readable storage medium of claim 11, wherein the instructions, when executed by the at least one processor, further enables the computing system to:
- determine that the computed distance fails to satisfy a threshold distance; and
- store the at least one voice property value in the brand database.

20. A computing system for synthesizing speech audio, comprising:
- a processor; and
- a memory device including instructions that, when executed by the processor, enables the computing system to:
  - receive a string of text and at least one voice property value with a perceptible meaning, wherein the at least one voice property value comprises a voice property vector,
  - read at least one stored voice property vector from a brand database,
  - compute a distance between the at least one stored voice property vector and the voice property vector to generate a computed distance,
  - generate code for execution by a computer, the code implementing a neural speech synthesis model, wherein a node in a hidden layer includes, in its summation, a constant term derived from a product of the at least one voice property value and a weight learned from a training process, and
  - output the code, wherein synthesizing speech audio corresponding to the string of text using the neural speech synthesis model that conditions a sound of speech audio on the at least one voice property value generates synthesized speech audio wherein the sound of the synthesized speech audio perceptually relates to the at least one voice property value, and wherein the code implements a speech synthesis function of a speech synthesizer.

* * * * *